(12) United States Patent
Rosewarne et al.

(10) Patent No.: US 10,462,470 B2
(45) Date of Patent: Oct. 29, 2019

(54) METHOD, APPARATUS AND SYSTEM FOR COPYING A BLOCK OF VIDEO SAMPLES

(71) Applicant: CANON KABUSHIKI KAISHA, Tokyo (JP)

(72) Inventors: Christopher James Rosewarne, Concord West (AU); Volodymyr Kolesnikov, Marsfield (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 14/711,421

(22) Filed: May 13, 2015

(65) Prior Publication Data

US 2015/0334405 A1    Nov. 19, 2015

(30) Foreign Application Priority Data

May 16, 2014    (AU) .............................. 2014202682

(51) Int. Cl.

| | |
|---|---|
| *H04N 19/176* | (2014.01) |
| *H04N 19/593* | (2014.01) |
| *H04N 19/139* | (2014.01) |
| *H04N 19/159* | (2014.01) |
| *H04N 19/196* | (2014.01) |
| *H04N 19/463* | (2014.01) |

(52) U.S. Cl.
CPC ......... *H04N 19/176* (2014.11); *H04N 19/139* (2014.11); *H04N 19/159* (2014.11); *H04N 19/196* (2014.11); *H04N 19/463* (2014.11); *H04N 19/593* (2014.11)

(58) Field of Classification Search
CPC .. H04N 19/176; H04N 19/139; H04N 19/159; H04N 19/196; H04N 19/463; H04N 19/593
USPC ..................................... 375/240.02
See application file for complete search history.

(56) References Cited

U.S. PATENT DOCUMENTS

| 5,764,374 A  * | 6/1998 | Seroussi .............. H04N 19/593 341/65 |
| 8,594,203 B2 * | 11/2013 | Ugur ........................ H04N 7/12 348/394.1 |
| 2013/0251041 A1* | 9/2013 | Guo ..................... H04N 19/513 375/240.16 |

(Continued)

OTHER PUBLICATIONS

M. Karczewicz, L. Guo, J. Sole, R. Joshi, K. Sharman, N. Saunders, J. Gamei. RCE2: Results of Test 1 on Rice Parameter Initialization. Qualcomm, Sony Europe: JCT-VC document register, Mar. 2014.

(Continued)

*Primary Examiner* — William C Vaughn, Jr.
*Assistant Examiner* — Jae N Noh
(74) *Attorney, Agent, or Firm* — Canon U.S.A., Inc. IP Division

(57) ABSTRACT

A method of copying a block of samples of a video bitstream, is disclosed. A plurality of adaptation parameters is read from a local memory store. Each adaptation parameter corresponds to a component of a multi-dimensional vector in the video bitstream. Each of the components of the vector is decoded from the video bitstream using the corresponding adaptation parameter. The block of samples is copied from the video bitstream. The spatial location of the block of samples is identified using the decoded components of the vector.

33 Claims, 19 Drawing Sheets

(56) References Cited

U.S. PATENT DOCUMENTS

2014/0192893 A1* 7/2014 Sullivan .......... H04N 21/23424
375/240.25
2015/0110181 A1* 4/2015 Saxena ................ H04N 19/176
375/240.12

OTHER PUBLICATIONS

Chao Pang, Joel Sole, Ted Hsieh, Marta Karczewicz. Intra block copy with larger search region. Qualcomm, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014.

* cited by examiner

700

| Remaining magnitude | k = 0 Codeword | k = 1 Codeword | k = 2 Codeword |
|---|---|---|---|
| 0 | 0 | 0 0 | 0 00 |
| 1 | 10 0 | 0 1 | 0 01 |
| 2 | 10 1 | 10 00 | 0 10 |
| 3 | 110 00 | 10 01 | 0 11 |
| 4 | 110 01 | 10 10 | 10 000 |
| 5 | 110 10 | 10 11 | 10 001 |
| 6 | 110 11 | 110 000 | 10 010 |
| 7 | 1110 000 | 110 001 | 10 011 |
| 8 | 1110 001 | 110 010 | 10 100 |
| 9 | 1110 010 | 110 011 | 10 101 |
| 10 | 1110 011 | 110 100 | 10 110 |
| 11 | 1110 100 | 110 101 | 10 111 |
| 12 | 1110 101 | 110 110 | 110 0000 |
| 13 | 1110 110 | 110 111 | 110 0001 |
| 14 | 1110 111 | 1110 0000 | 110 0010 |

| Remaining magnitude | Rice parameter = 0 | Rice parameter = 1 | Rice parameter = 2 |
|---|---|---|---|
| | Codeword | Codeword | Codeword |
| 0 | 0 | 00 | 000 |
| 1 | 10 | 01 | 001 |
| 2 | 110 | 100 | 010 |
| 3 | 111 00 | 101 | 011 |
| 4 | 111 01 | 1100 | 1000 |
| 5 | 111 1000 | 1101 | 1001 |
| 6 | 111 1001 | 111 000 | 1010 |
| 7 | 111 1010 | 111 001 | 1011 |
| 8 | 111 1011 | 111 010 | 1100 |
| 9 | 111 110000 | 111 011 | 11001 |
| 10 | 111 110001 | 111 10000 | 11010 |
| 11 | 111 110010 | 111 10001 | 11011 |
| 12 | 111 110011 | 111 10010 | 111 0000 |
| 13 | 111 110100 | 111 10011 | 111 0001 |
| 14 | 111 110101 | 111 10100 | 111 0010 |

| Component magnitude | Significant Flag (904 or 906) | Threshold flag (908 or 910) | Remaining magnitude (1 bit FLC or EGk, k=4) (912 or 914) |
|---|---|---|---|
| 0 | 0 | | |
| 1 | 1 | 0 | 0 |
| 2 | 1 | 0 | 1 |
| 3 | 1 | 1 | 00000 |
| 4 | 1 | 1 | 00001 |
| 5 | 1 | 1 | 00010 |
| 6 | 1 | 1 | 00011 |
| 7 | 1 | 1 | 00100 |
| 8 | 1 | 1 | 00101 |
| 9 | 1 | 1 | 00110 |
| 10 | 1 | 1 | 00111 |
| 11 | 1 | 1 | 01000 |
| 12 | 1 | 1 | 01001 |
| 13 | 1 | 1 | 01010 |
| 14 | 1 | 1 | 01011 |
| … | … | … | … |
| 19 | 1 | 1 | 1000000 |
| 20 | 1 | 1 | 1000001 |

Fig. 17

METHOD, APPARATUS AND SYSTEM FOR COPYING A BLOCK OF VIDEO SAMPLES

REFERENCE TO RELATED PATENT APPLICATION(S)

This application claims the benefit under 35 U.S.C. § 119 of the filing date of Australian Patent Application No. 2014202682, filed 16 May 2014, hereby incorporated by reference in its entirety as if fully set forth herein.

TECHNICAL FIELD

The present invention relates generally to digital video signal processing and, in particular, to a method, apparatus and system for copying a block of video samples. The present invention also relates to a computer program product including a computer readable medium having recorded thereon a computer program for copying a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" (ISO/IEC 14496-10) video coding standard. The new video coding standard has been named "high efficiency video coding (HEVC)". Further development of high efficiency video coding (HEVC) is directed towards introducing improved support for content known variously as 'screen content' or 'discontinuous tone content'. Such content is typical of output from a computer or a tablet device. Such content is poorly handled by previous video compression standards and thus a new activity directed towards improving the achievable coding efficiency for this type of content is underway.

Video data includes one or more colour channels. Typically three colour channels are supported and colour information is represented using a 'colour space'. One example colour space is known as 'YCbCr', although other colour spaces are also possible. The 'YCbCr' colour space enables fixed-precision representation of colour information and thus is well suited to digital implementations. The 'YCbCr' colour space includes a 'luma' channel (Y) and two 'chroma' channels (Cb and Cr). Each colour channel has a particular bit-depth. The bit-depth defines the bit width of samples in the respective colour channel, which implies a range of available sample values. Generally, all colour channels have the same bit-depth, although they may also have different bit-depths. Screen content is often encoded using an 'RGB' (i.e. red green blue) colour space.

In high efficiency video coding (HEVC), there are three types of prediction methods used: intra-prediction, intra block copy prediction and inter-prediction. Intra-prediction methods allow content of one part of a video frame to be predicted from other parts of the same video frame. Intra-prediction methods typically produce a block having a directional texture, with an intra-prediction mode specifying the direction of the texture and neighbouring samples within a frame used as a basis to produce the texture. The intra block copy prediction method uses a block of samples from the current frame as a prediction for a current block. Inter-prediction methods predict the content of a block within a video frame from blocks in previous video frames. The previous video frames (i.e. in 'decoding order' as opposed to 'display order' which may be different) may be referred to as 'reference frames'.

The first video frame within a sequence of video frames typically uses intra-prediction for all blocks of samples within the frame, as no prior frame is available for reference. Subsequent video frames may use one or more previous video frames from which to predict blocks of samples. To maximise coding efficiency, the prediction method that produces a predicted block that is closest to captured frame data is typically used. The remaining difference between the predicted block of samples and the captured frame data is known as the 'residual'. This spatial domain representation of the difference is generally transformed into a frequency domain representation. Generally, the frequency domain representation compactly stores information present in the spatial domain representation. The frequency domain representation includes a block of 'residual coefficients' that results from applying a transform, such as an integer discrete cosine transform (DCT). Moreover, the residual coefficients (or 'scaled transform coefficients') are quantised, which introduces loss but also further reduces the amount of information required to be encoded in a bitstream. The lossy frequency domain representation of the residual, also known as 'transform coefficients', may be stored in the bitstream. The amount of lossiness in the residual recovered in a decoder affects the distortion of video data decoded from the bitstream compared to the captured frame data and the size of the bitstream.

A video bitstream includes a sequence of encoded syntax elements. The syntax elements are ordered according to a hierarchy of 'syntax structures'. Each syntax element is composed of one or more 'bins', which are encoded using a 'context adaptive binary arithmetic coding' (CABAC) algorithm. A given bin may be 'bypass' coded, in which case there is no 'context' associated with the bin. Alternatively, a bin may be 'context' coded, in which case there is context associated with the bin. Each context coded bin has one context associated with the bin, where the context is selected from a set of one or more contexts. The selected context is retrieved from a context memory and each time a context is used (i.e. selected), the context is also updated and then stored back in context memory. When encoding or decoding the bin, prior information in the bitstream is used to select which context to use. Context information in a decoder necessarily tracks context information in the encoder (otherwise a decoder could not parse a bitstream produced by an encoder). The context includes two parameters: a likely bin value (or 'valMPS') and a probability level (or 'pStateIdx').

A syntax element with two distinct values may also be referred to as a 'flag' and is generally encoded and decoded using one context coded bin. A syntax element with more distinct values requires more than one bin, and may use a combination of context coded bins and bypass coded bins. In the high efficiency video coding (HEVC) standard, syntax elements are grouped into syntax structures. A given syntax structure defines the possible syntax elements that can be included in a video bitstream and the circumstances in which each syntax element is included in the video bitstream. Each instance of a syntax element contributes to the size of the video bitstream.

An objective of video compression is to enable representation of a given sequence using a video bitstream and having minimal size (e.g. in bytes) for a given quality level (including both lossy and lossless cases). At the same time, video decoders are invariably required to decode video bitstreams in real time, placing limits on the complexity of the algorithms that can be used. As such, a trade-off between algorithmic complexity and compression performance is made. In particular, modifications that can improve or maintain compression performance while reducing algorithmic complexity are desirable.

For each block predicted using intra block copy mode, a vector or delta vector is present in the bitstream to signal the location of the reference block, relative to current block position. The statistical distribution of block vector values can vary greatly and efficient methods to encode such block vectors are highly desirable.

SUMMARY

It is an object of the present invention to substantially overcome, or at least ameliorate, one or more disadvantages of existing arrangements.

According to one aspect of the present disclosure, there is provided a method of copying a block of samples of a video bitstream, the method comprising:

reading a plurality of adaptation parameters from a local memory store, each adaptation parameter corresponding to a component of a multi-dimensional vector in the video bitstream;

decoding each of the components of the vector from the video bitstream using the corresponding adaptation parameter; and copying the block of samples from the video bitstream, the spatial location of the block of samples being identified using the decoded components of the vector.

According to another aspect of the present disclosure, there is provided a system for copying a block of samples of a video bitstream, the system comprising:

a memory having data and a computer program stored thereon;

a processor coupled to the memory for executing the computer program, the computer program having instructions for:

reading a plurality of adaptation parameters from a local memory store, each adaptation parameter having a corresponding component of a multi-dimensional vector in the video bitstream;

decoding each of the components of the vector from the video bitstream using the corresponding adaptation parameter; and copying the block of samples from the video bitstream, the spatial location of the block of samples being identified using the decoded components of the vector.

According to still another aspect of the present disclosure, there is provided an apparatus for copying a block of samples of a video bitstream, the apparatus comprising:

reading module for reading a plurality of adaptation parameters from a local memory store, each adaptation parameter having a corresponding component of a multi-dimensional vector in the video bitstream;

decoding module for decoding each of the components of the vector from the video bitstream using the corresponding adaptation parameter; and copying module for copying the block of samples from the video bitstream, the spatial location of the block of samples being identified using the decoded components of the vector.

According to still another aspect of the present disclosure, there is provided a computer readable medium having a computer program stored on the medium for copying a block of samples of a video bitstream, the program comprising:

code for reading a plurality of adaptation parameters from a local memory store, each adaptation parameter having a corresponding component of a multi-dimensional vector in the video bitstream;

code for decoding each of the components of the vector from the video bitstream using the corresponding adaptation parameter; and code for copying the block of samples from the video bitstream, the spatial location of the block of samples being identified using the decoded components of the vector.

According to still another aspect of the present disclosure, there is provided a method of copying a block of samples of a video bitstream, the method comprising:

reading a plurality of adaptation parameters from a local memory store, each adaptation parameter having a corresponding component of a multi-dimensional vector in the video bitstream;

decoding each of the components of the vector from the video bitstream using the corresponding adaptation parameter; and copying the block of samples from the video bitstream, the spatial location of the block of samples being identified using the decoded components of the vector.

According to still another aspect of the present disclosure, there is provided a method of copying a block of samples of a video bitstream, the method comprising:

reading a plurality of adaptation parameters from a local memory store, each adaptation parameter having a corresponding component of a multi-dimensional vector in the video bitstream;

decoding each of the components of the vector from the video bitstream using the corresponding adaptation parameter; and copying the block of samples from the video bitstream, the spatial location of the block of samples being identified using the decoded components of the vector, wherein one or more of said adaptation parameter are updated using the corresponding decoded component for use in decoding further multi-dimensional vectors from the video bitstream.

According to still another aspect of the present disclosure, there is provided a method of copying a block of samples of a video bitstream, the method comprising:

reading a plurality of adaptation parameters from a local memory store, each adaptation parameter corresponding to a component of a multi-dimensional vector in the video bitstream and having independent values;

decoding each of the components of the vector from the video bitstream using the corresponding adaptation parameter; and copying the block of samples from the video bitstream, the spatial location of the block of samples being identified using the decoded components of the vector.

According to still another aspect of the present disclosure, there is provided a system for copying a block of samples of a video bitstream, the system comprising:

a memory having data and a computer program stored thereon;

a processor coupled to the memory for executing the computer program, the computer program having instructions for:

reading a plurality of adaptation parameters from a local memory store, each adaptation parameter corresponding to a component of a multi-dimensional vector in the video bitstream and having independent values;

decoding each of the components of the vector from the video bitstream using the corresponding adaptation parameter; and copying the block of samples from the video bitstream, the spatial location of the block of samples being identified using the decoded components of the vector.

According to still another aspect of the present disclosure, there is provided an apparatus for copying a block of samples of a video bitstream, the method comprising:

reading module reading a plurality of adaptation parameters from a local memory store, each adaptation parameter corresponding to a component of a multi-dimensional vector in the video bitstream and having independent values;

decoding module for decoding each of the components of the vector from the video bitstream using the corresponding adaptation parameter; and copying module for copying the block of samples from the video bitstream, the spatial location of the block of samples being identified using the decoded components of the vector.

According to still another aspect of the present disclosure, there is provided a computer readable medium having a computer program stored on the medium for copying a block of samples of a video bitstream, the program comprising:

code for reading a plurality of adaptation parameters from a local memory store, each adaptation parameter corresponding to a component of a multi-dimensional vector in the video bitstream and having independent values;

code for decoding each of the components of the vector from the video bitstream using the corresponding adaptation parameter; and code for copying the block of samples from the video bitstream, the spatial location of the block of samples being identified using the decoded components of the vector.

Other aspects are also disclosed.

BRIEF DESCRIPTION OF THE DRAWINGS

At least one embodiment of the present invention will now be described with reference to the following drawings and and appendices, in which:

FIG. 17 is a table showing codewords for binarisation of delta block vector component magnitudes using a fixed length codeword or a kth order Exponential Golomb codeword; and Appendix 1 and Appendix 2 provide syntax tables according to the HEVC standard modified according to the modifications and variations disclosed herein.

DETAILED DESCRIPTION INCLUDING BEST MODE

Figure 1:
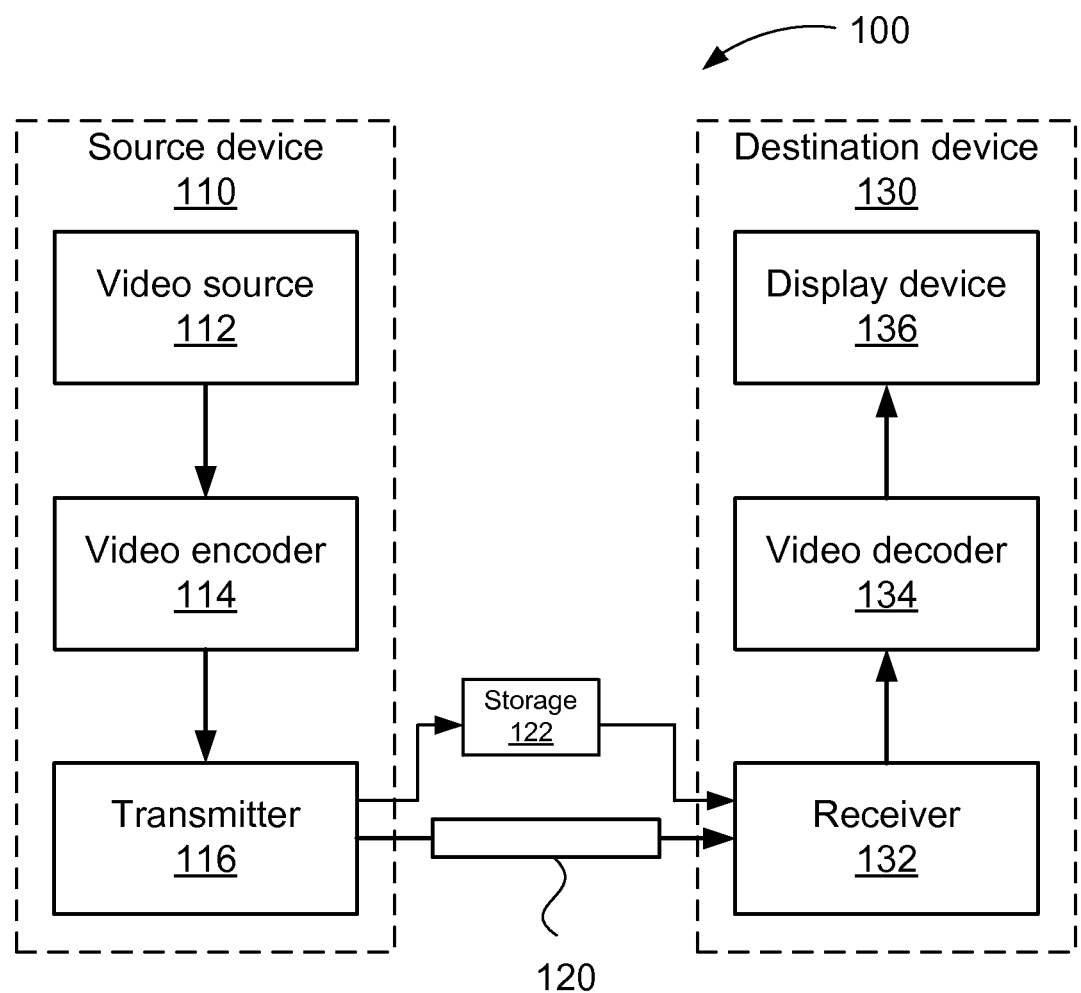
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing function modules of a video encoding and decoding system 100. The system 100 may utilise methods for intra block copy to improve the coding efficiency of block vectors associated with an intra block copy operation. In particular, high coding efficiency of block vectors is achieved even when different sized regions of a frame are searched by the video encoder, whereas prior methods were targeted only towards small search regions. For example, an encoder operating with restrictive resource requirements may search a local area for candidate blocks when the encoder is operating in intra block copy mode, whereas an encoder with less restrictive resource requirements may search blocks up to the full extent of the available search area. Then, methods for block vector coding that do not sacrifice performance in either situation are desirable. Moreover, an adaptive quality of the block vector coding method eliminates the necessity for the encoder to make additional decisions with regard to the encoding method of the block vectors.

The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video data is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically an encoded bitstream and is transmitted by the transmitter 116 over the communication channel 120 as encoded video data (or "encoded video information"). It is also possible for the encoded video data to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
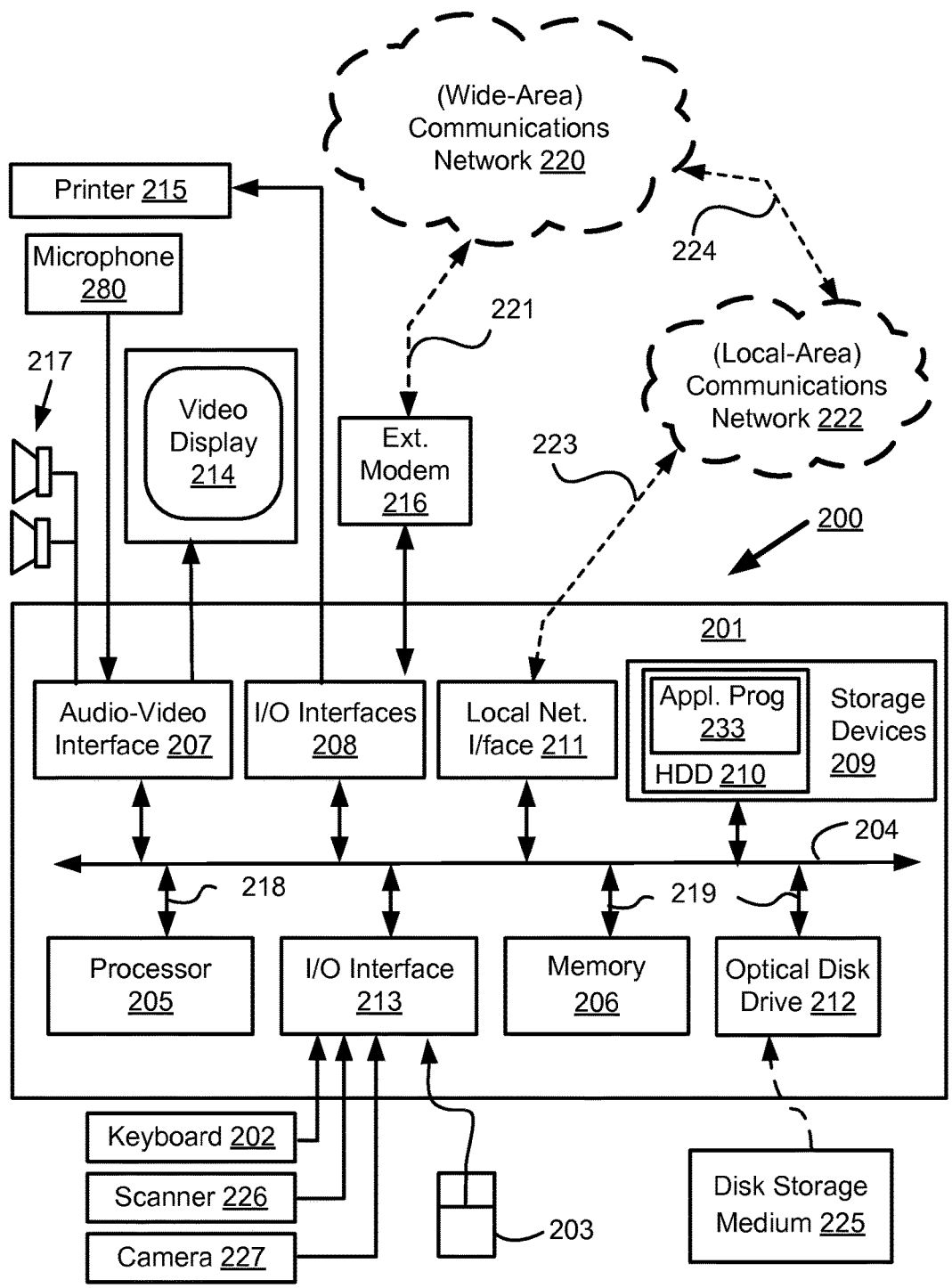
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
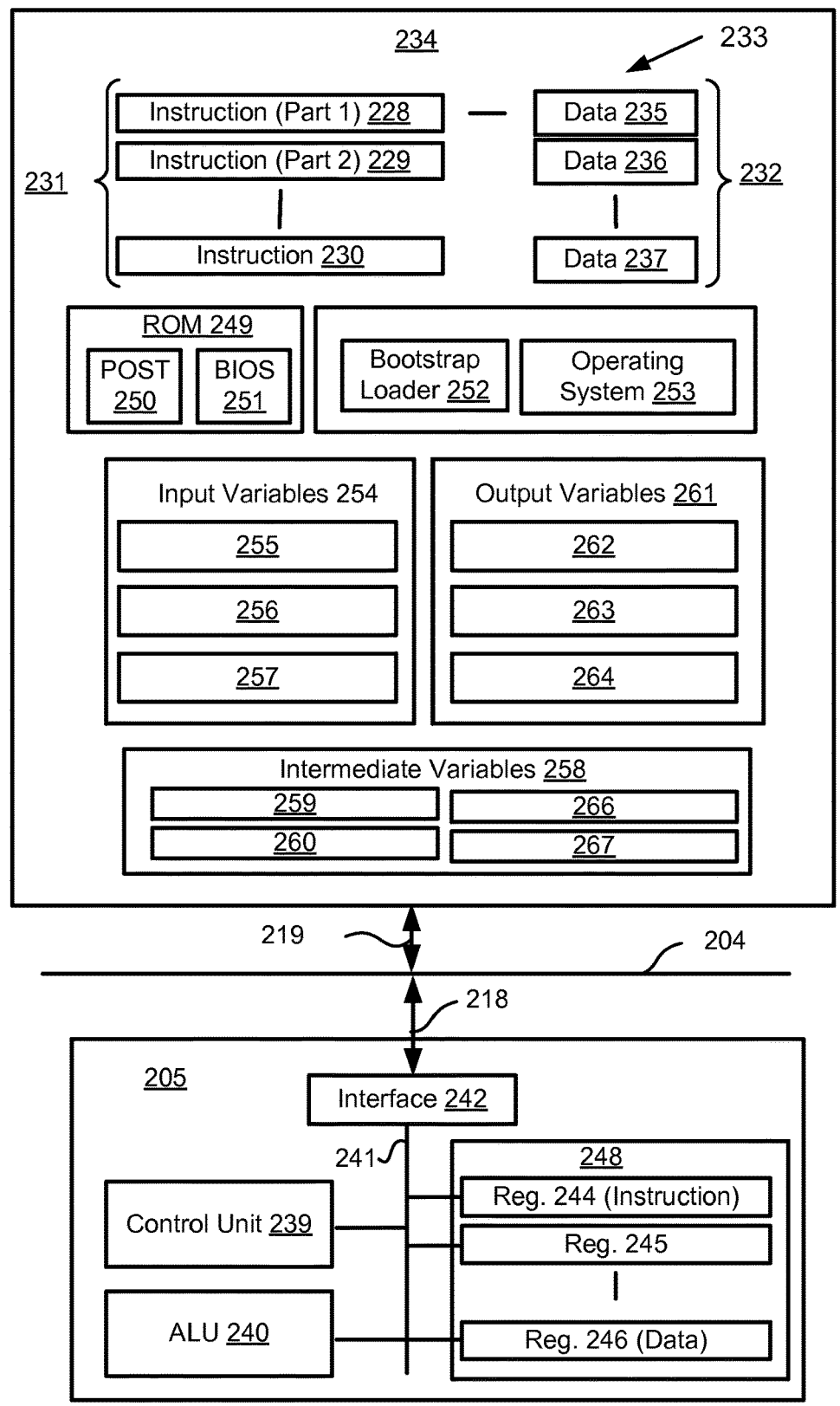

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods FIGS. 10, 11, 12, 13, 14, 15 and 16, to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
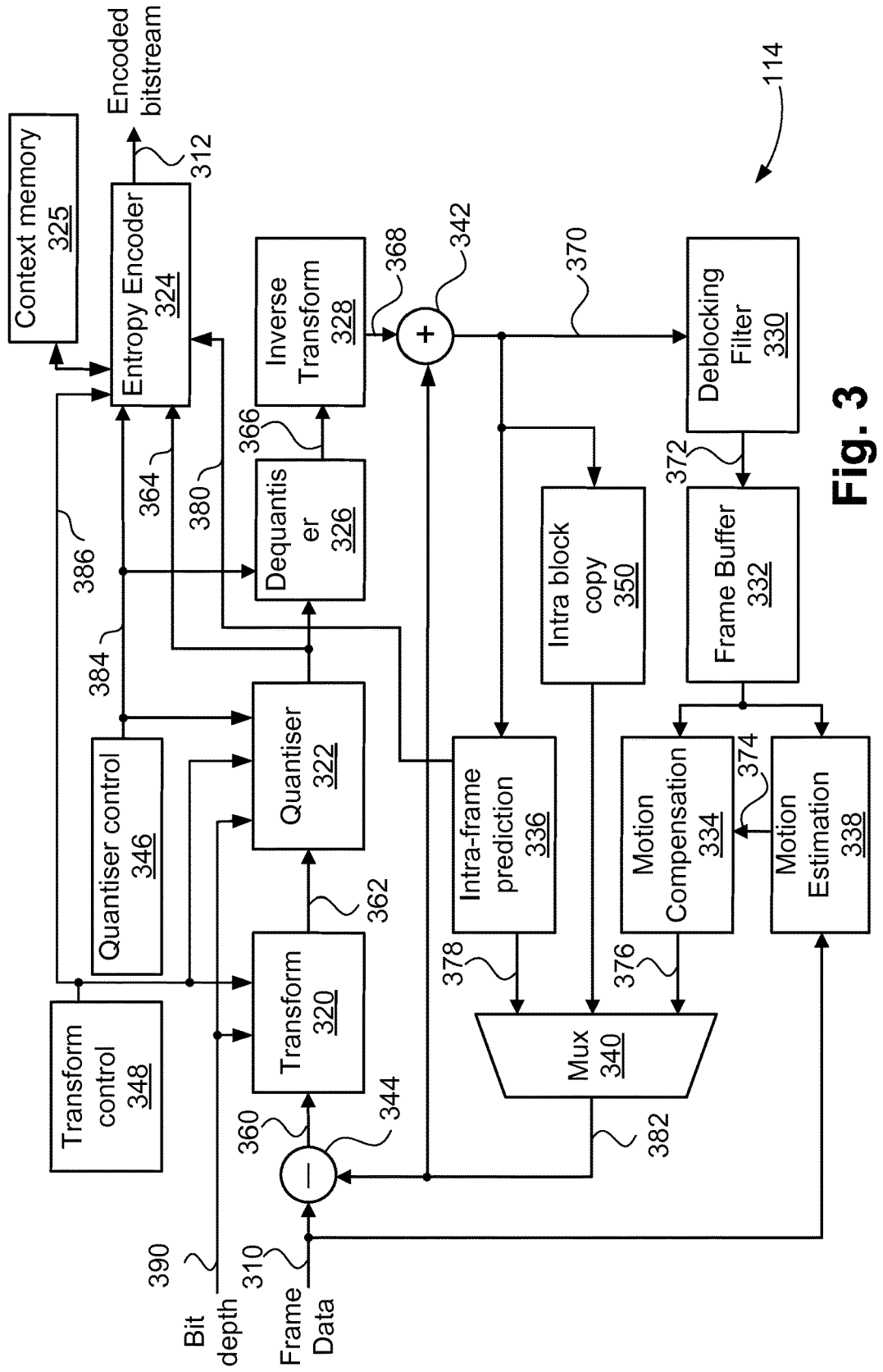
FIG. 3 is a schematic block diagram showing functional modules of a video encoder.
Figure 4:
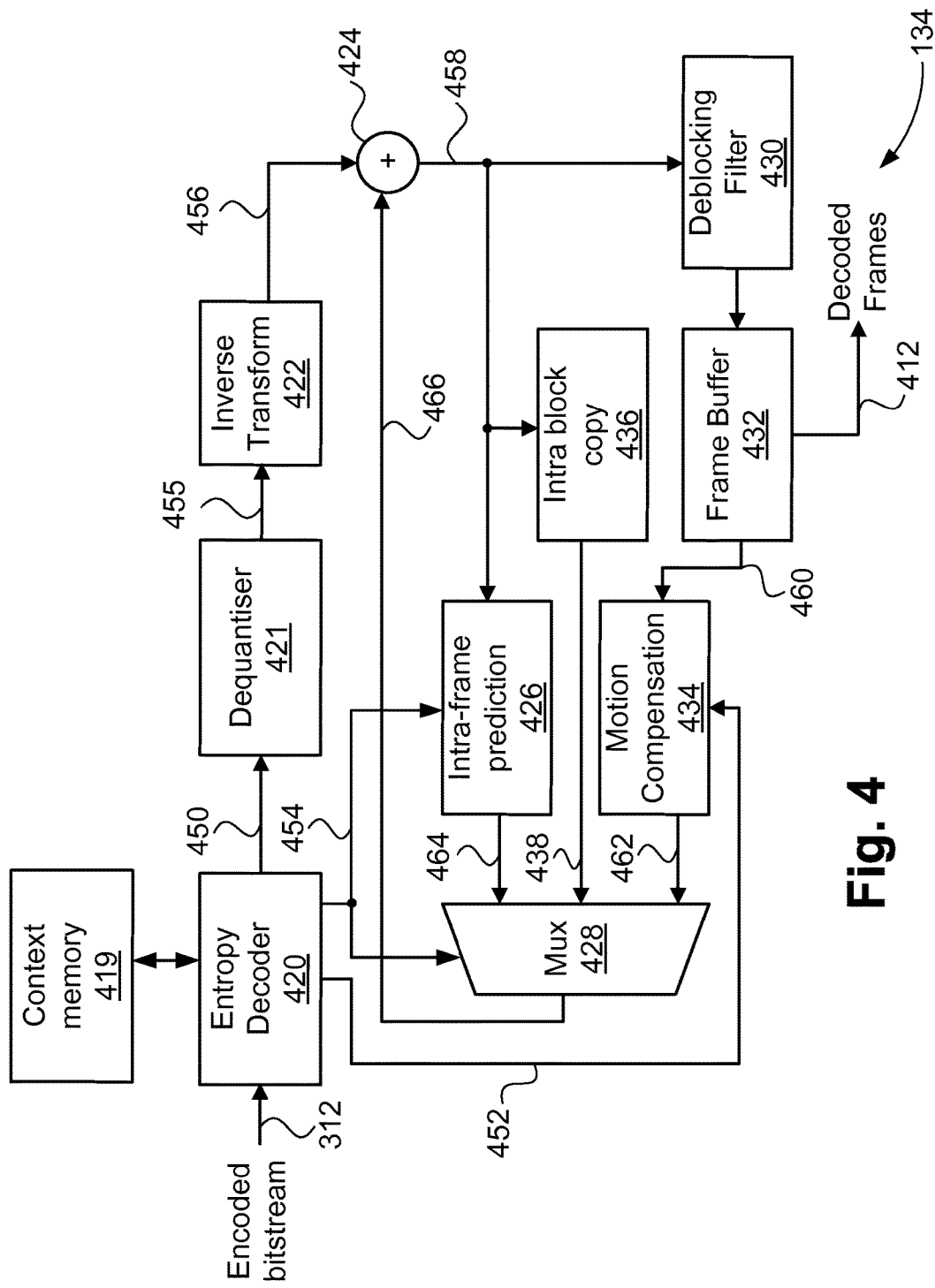
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or a transform coefficients), the behaviour shall be understood to be applied to all array elements. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-348 and the video decoder 134 comprises modules 420-436 which may each be implemented as one or more software code modules of the software application program 233.

Although the video encoder 114 of FIG. 3 is an example of a high efficiency video coding (HEVC) video encoding pipeline, other video codecs may also be used to perform the processing stages described herein. The video encoder 114 receives captured frame data, such as a series of frames, each frame including one or more colour channels.

The video encoder 114 divides each frame of the captured frame data, such as frame data 310, into regions generally referred to as 'coding tree units' (CTUs) with side sizes which are powers of two. The notion of coding tree unit (CTU) refers collectively to all colour channels of the picture. Every coding tree unit (CTU) includes individual coding tree blocks (CTBs) for each colour channel. For example in a frame coded using the YCbCr colour space, a coding tree unit (CTU) consists of tree coding tree blocks (CTBs) for Y, Cb and Cr colour planes corresponding to the same spatial location in the picture. The size of individual coding tree blocks (CTBs) may vary across colour components and generally depends on used colour component scaling mode. For example, in the mode generally known as "4:4:4" mode where all colour components have the same size, the sizes of the coding tree blocks (CTBs) will be the same. In the mode generally known as "4:2:0" where chroma components are scaled down by factor of two both horizontally and vertically the sizes of chroma coding tree blocks (CTBs) will be twice smaller (both horizontally and vertically) than the size of the luma coding tree block (CTB). When a size of a coding tree unit (CTU) is specified the size usually refers to the size of the luma coding tree block (CTB). The sizes of the chroma coding tree blocks (CTBs) can always be inferred from the size of the coding tree unit (CTU) and the colour component scaling mode.

Each coding tree unit (CTU) includes a hierarchical quad-tree subdivision of a portion of the frame with a collection of 'coding units' (CUs), such that at each leaf node of the hierarchical quad-tree subdivision one coding unit (CU) exists. The subdivision can be continued until the coding units (CU) present at the leaf nodes have a specific minimum size is reached. The specific minimum size is referred to as a smallest coding unit (SCU) size. Generally, the smallest coding unit (SCU) size is 8×8, but other sizes are also possible, such as 16×16 or 32×32. Note that the size of a coding unit (CU) is specified in units of luma samples. The corresponding coding block (CB) for the luma channel will thus have the same dimensions as the coding unit (CU). The corresponding coding blocks (CBs) for the chroma channels will have dimensions scaled according to the chroma subsampling size. For example, when a 4:2:0 chroma format is in use, an 8×8 coding unit (CU) includes a 4×4 coding block (CBs) for each chroma channel. The smallest coding unit (SCU) size is specified using a 'log 2_min_luma_coding_block_size_minus3' syntax element in the high level syntax. Smallest coding unit (SCU) sizes of 8×8, 16×16 and 32×32 are indicated with values of 0, 1, 2 respectively for this syntax element. If on the other hand no subdivision of a coding tree unit (CTU) is done and a single coding unit (CU) occupies the whole coding tree unit (CTU) such a coding unit (CU) is referred to as a largest coding unit (LCU) (or "maximum coding unit size). Generally the largest coding unit (LCU) size is 64×64, but other sizes are also possible, such as 32×32 and 16×16. These dimensions are also specified in units of luma samples. The largest coding unit (LCU) size is signalled in the bitstream using a 'log 2_diff_max_min_luma_coding_block_size' syntax element in combination with the 'log 2_min_luma_coding_block_size_minus3' syntax element (both in high level syntax). The sum of these two syntax elements having values of 0, 1, 2, 3 indicates a largest coding unit (LCU) size of 8×8, 16×16, 32×32 and 64×64 respectively. In specific implementations, the size of the largest coding unit is not equal to the size of the smallest coding unit. As a result of the quad-tree hierarchy, the entirety of the coding tree unit (CTU) is occupied by one or more coding units (CUs). The largest coding unit size is signalled in the bitstream for a collection of frames known as a coded video sequence. Bitstreams may have various largest coding unit sizes and where multiple coded video sequences are present within one bitstream, multiple largest coding unit (LCU) sizes may exist within the one bitstream. For a given frame, the largest coding unit (LCU) size and the smallest coding unit (SCU) size do not vary.

A quad-tree subdivision of a coding tree unit (CTU) implies subdivision of coding tree blocks (CTBs) for each colour channel into four 'coding blocks' (CBs) of equal size. For example, if a coding tree unit (CTU) of a frame encoded using the "4:2:0" colour component scaling mode, of size 64×64 samples is split, it may be implied that a corresponding luma coding tree block (CTB) is split into four coding blocks (CBs) of 32×32 samples, and corresponding chroma coding tree blocks (CTBs) (having size of 32×32 samples) will be split into four coding blocks (CBs) of 16×16 samples. Coding blocks (CBs) corresponding to smallest coding units (SCUs) are referred to as smallest coding blocks (SCBs). Coding blocks (CBs) corresponding to largest coding units (LCUs) are referred to as largest coding blocks (LCBs).

In the HEVC standard a coding tree unit (CTU) has size 64×64 samples, although other sizes are possible, such as 16×16 or 32×32. In some cases even larger sizes for the coding tree unit (CTU), such as 128×128 samples, may be used.

The video encoder 114 produces one or more 'prediction units' (PUs) for each coding block (CU). Various arrangements of prediction units (PUs) in each coding unit (CU) are possible, with a requirement that the prediction units (PUs) do not overlap and that the entirety of the coding unit (CU) is occupied by the one or more prediction units (PUs). Such a requirement ensures that the prediction units (PUs) cover the entire frame area. A partitioning of a coding unit (CU) into prediction units (PUs) implies subdivision of coding blocks (CBs) for each colour component into 'prediction blocks' (PBs). Depending on used colour component scaling mode, the sizes of prediction blocks (PBs) corresponding to the same coding unit (CU) for different colour component may differ in size.

The video encoder 114 operates by outputting, from a multiplexer module 340, a prediction unit (PU) 382. A difference module 344 produces a 'residual sample array' 360. The residual sample array 360 is the difference between the prediction unit (PU) 382 and a corresponding 2D array of data samples from a coding unit (CU) of the coding tree block (CTB) of the frame data 310. The difference is calculated for corresponding samples at each location in the arrays. As differences may be positive or negative, the dynamic range of one difference sample is the bit-depth plus one bit.

The residual sample array 360 may be transformed into the frequency domain in a transform module 320. The residual sample array 360 from the difference module 344 is received by the transform module 320, which converts the residual sample array 360 from a spatial representation to a frequency domain representation by applying a 'forward transform'. The transform module 320 creates transform coefficients, according to a transform having a specific precision. The coding unit (CU) is sub-divided into one or more transform units (TUs). The sub-divided coding unit (CU) may be referred to as a 'residual quad-tree' or a 'residual quad-tree (RQT)'. The notion of transform unit (TU) refers collectively to all colour components. Every transform unit (TU) includes individual transform blocks (TBs) for each colour channel. Depending on the colour component scaling mode applied to the picture transform blocks (TBs) for chroma channels may have smaller sizes than a corresponding luma transform block (TB) due to colour component scaling.

The quantiser control module 346 may test the bit-rate required in the encoded bitstream 312 for various possible quantisation parameter values according to a 'rate-distortion criterion'. The rate-distortion criterion is a measure of the acceptable trade-off between the bit-rate of the encoded bitstream 312, or a local region thereof, and distortion. Distortion is a measure of the difference between frames present in the frame buffer 332 and the captured frame data 310. Distortion may be determined using a peak signal to noise ratio (PSNR) or sum of absolute differences (SAD) metric. In some arrangements of the video encoder 114, the rate-distortion criterion considers only the rate and distortion for the luma colour channel and thus the encoding decision is made based on characteristics of the luma channel. Generally, the residual quad-tree (RQT) is shared between the luma and chroma colour channels, and the amount of chroma information is relatively small compared to luma, so considering luma only in the rate-distortion criterion may be appropriate.

A quantisation parameter 384 is output from the quantiser control module 346. The quantisation parameter may be fixed for a frame of video data, or may vary on a block by block basis as the frame is being encoded. Other methods for controlling the quantisation parameter 384 are also possible. The set of possible transform units (TUs) for a residual quad-tree is dependent on the available transform sizes and coding unit (CU) size. A larger sized transform unit (TU) results in use of larger transforms for both the luma and chroma colour channels. Generally, larger transforms provide a more compact representation of a residual sample array with sample data (or 'residual energy') spread across the residual sample array. Smaller transform units (TUs) provide a more compact representation of a residual sample array with residual energy localised to specific regions of the residual sample array. Thus, the many possible configurations of a residual quad-tree (RQT) provide a useful means for achieving high coding efficiency of the residual sample array 360 in the high efficiency video coding (HEVC) standard.

A transform control module 348 selects a transform size for use in encoding each leaf node of the residual quad-tree (RQT). For example, a variety of transform sizes (and hence residual quad-tree configurations) may be tested and the transform size resulting in the best trade-off from a rate-distortion criteria may be selected. A transform size 386 represents the size of the selected transform. The transform size 386 is encoded in the encoded bitstream 312 and provided to the transform module 320, the quantiser module 322, the dequantiser module 326 and the inverse transform module 328. The transform size 386 may be represented by the transform dimensions (e.g. 4×4, 8×8, 16×16 or 32×32), the transform size (e.g. 4, 8, 16 or 32), or the log 2 of the transform size (e.g. 2, 3, 4 or 5) interchangeably. In circumstances where the numeric value of a particular representation of a transform size is used (e.g. in an equation) conversion from any other representation of the transform size deemed necessary, shall be considered to implicitly occur in the following description.

A 'transform quantisation bypass' mode is provided, where the transform module 320 and the quantisation module 322 are bypassed. The transform quantisation bypass mode is signalled at the coding unit (CU) level using a 'cu_transquant_bypass_flag' syntax element. The transform quantisation bypass mode provides a means to losslessly encode the frame data 310 in the encoded bitstream 312. Use of the transform quantisation bypass mode is controlled at the coding unit (CU) level, allowing portions of the frame data 310 to be losslessly encoded. The availability of the transform quantisation bypass mode is controlled via 'high level syntax', enabling the signalling overhead of controlling transform quantisation bypass mode to be removed in cases where lossless encoding is not required in any portion of the frame data 310. High level syntax refers to portions of the encoded bitstream 312 that are generally encoded infrequently and are used to describe properties of the bitstream (e.g. to restrict or otherwise configure particular coding tools used in the video encoder 114 and the video decoder 134). Examples of high level syntax include 'sequence parameter sets', 'picture parameter sets' and 'slice headers'.

For the high efficiency video coding (HEVC) standard, conversion of the residual sample array 360 to the frequency domain representation is implemented using a transform such as a modified discrete cosine transform (DCT). In such transforms, the modification permits implementation using shifts and additions instead of multiplications. The modifications enable reduced implementation complexity compared to a discrete cosine transform (DCT). In addition to the modified discrete cosine transform (DCT), a modified discrete sine transform (DST) may also be used in specific circumstances. Various sizes of the residual sample array 360 and the scaled transform coefficients 362 are possible, in accordance with supported transform sizes. In the high efficiency video coding (HEVC) standard, transforms are performed on 2D arrays of data samples having sizes, such as 32×32, 16×16, 8×8 and 4×4. Thus, a predetermined set of transform sizes are available to the video encoder 114. Moreover, the set of transform sizes may differ between the luma channel and the chroma channels.

Two-dimensional transforms are generally configured to be 'separable', enabling implementation as a first set of 1D transforms operating on the 2D array of data samples in one direction (e.g. on rows). The first set of 1D transforms is followed by a second set of 1D transform operating on the 2D array of data samples output from the first set of 1D transforms in the other direction (e.g. on columns). Transforms having the same width and height are generally referred to as 'square transforms'. Additional transforms, having differing widths and heights may also be used and are generally referred to as 'non-square transforms'. The row and column one-dimensional transforms may be combined into specific hardware or software modules, such as a 4×4 transform module or an 8×8 transform module.

Transforms having larger dimensions require larger amounts of circuitry to implement, even though such larger dimensioned transforms may be infrequently used. Accordingly, the high efficiency video coding (HEVC) standard defines a maximum transform size of 32×32 luma samples. Transforms may be applied to both the luma and chroma channels. Differences between the handling of luma and chroma channels with regard to transform units (TUs) exist. Each residual quad-tree occupies one coding unit (CU) and is defined as a quad-tree decomposition of the coding unit (CU) into a hierarchy including one transform unit (TU) at each leaf node of the residual quad-tree hierarchy. Each transform unit (TU) has dimensions corresponding to one of the supported transform sizes. Similarly to the coding tree unit (CTU), it is necessary for the entirety of the coding unit (CU) to be occupied by one or more transform units (TUs). At each level of the residual quad-tree hierarchy a 'coded block flag value' signals possible presence of a transform in each colour channel. The signalling may indicate presence of a transform at the current hierarchy level (when no further splits are present), or that lower hierarchy levels may contain at least one transform among the resulting transform units (TUs). When the coded block flag value is zero, all residual coefficients at the present or lower hierarchy levels are known to be zero. In such a case, no transform is required to be performed for the corresponding colour channel of any transform units (TU) at the present hierarchical level or at lower hierarchical levels. When the coded block flag value is one, if the present region is not further sub-divided then the region contains a transform which requires at least one non-zero residual coefficient. If the present region is further sub-divided, a coded block flag value of one indicates that each resulting sub-divided region may include non-zero residual coefficients. In this manner, for each colour channel, zero or more transforms may cover a portion of the area of the coding unit (CU) varying from none up to the entirety of the coding unit (CU). Separate coded block flag values exist for each colour channel. Each coded block flag value is not required to be encoded, as cases exist where there is only one possible coded block flag value.

The scaled transform coefficients 362 are input to the quantiser module 322 where data sample values thereof are scaled and quantised, according to a determined quantisation parameter 384, to produce transform coefficients 364. The transform coefficients 364 are an array of values having the same dimensions as the residual sample array 360. The transform coefficients 364 provide a frequency domain representation of the residual sample array 360 when a transform is applied. When the transform is skipped, the transform coefficients 364 provide a spatial domain representation of the residual sample array 360 (i.e. quantised by the quantiser module 322 but not transformed by the transform module 320). For the discrete cosine transform (DCT), the upper-left value of the transform coefficients 364 specifies a 'DC' value for the residual sample array 360 and is known as a 'DC coefficient'. The DC coefficient is representative of the 'average' of the values of the residual sample array 360. Other values in the transform coefficients 364 specify 'AC coefficients' for the residual sample array 360. The scale and quantisation results in a loss of precision, dependent on the value of the determined quantisation parameter 384. A higher value of the determined quantisation parameter 384 results in greater information being lost from the residual data. The loss of information increases the compression achieved by the video encoder 114, as there is less information to encode. This increase in compression efficiency occurs at the expense of reducing the visual quality of output from the video decoder 134. The determined quantisation parameter 384 may be adapted during encoding of each frame of the frame data 310. Alternatively, the determined quantisation parameter 384 may be fixed for a portion of the frame data 310. In one arrangement, the determined quantisation parameter 384 may be fixed for an entire frame of frame data 310. Other adaptations of the determined quantisation parameter 384 are also possible, such as quantising different residual coefficients with separate values.

The transform coefficients 364 and determined quantisation parameter 384 are taken as input to the dequantiser module 326. The dequantiser module 326 reverses the scaling performed by the quantiser module 322 to produce rescaled transform coefficients 366. The rescaled transform coefficients are rescaled versions of the transform coefficients 364. The transform coefficients 364, the determined quantisation parameter 384, the transform size 386 and the bit-depth 390 are also taken as input to an entropy encoder module 324. The entropy encoder module 324 encodes the values of the transform coefficients 364 in an encoded bitstream 312 (or 'video bitstream'). Context information for the entropy encoder module 324, e.g. for the adaptation parameters, is provided by a context memory 325 (or 'local memory store' in the video encoder 114), generally configured within the memory 206. Due to the loss of precision resulting from the operation of the quantiser module 322, the rescaled transform coefficients 366 are not identical to the original values in the scaled transform coefficients 362. The rescaled transform coefficients 366 from the dequantiser module 326 are then output to an inverse transform module 328. The inverse transform module 328 performs an inverse transform from the frequency domain to the spatial domain to produce a spatial-domain representation 368 of the rescaled transform coefficients 366. The spatial-domain representation 368 is substantially identical to a spatial domain representation that is produced at the video decoder 134. The spatial-domain representation 368 is then input to a summation module 342.

A motion estimation module 338 produces motion vectors 374 by comparing the frame data 310 with previous frame data from one or more sets of frames stored in a frame buffer module 332, generally configured within the memory 206. The sets of frames are known as 'reference picture lists'. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed to the entropy encoder module 324 for encoding in the encoded bitstream 312. The motion vectors are encoded as 'motion vector differences', i.e. differences between the motion vector for a current block and a neighbouring block. The intra-frame prediction module 336 produces an intra-predicted prediction unit (PU) 378 using samples 370 obtained from the summation module 342. In particular, the intra-frame prediction module 336 uses samples from neighbouring blocks that have already been decoded to produce intra-predicted samples for the current prediction unit (PU). When a neighbouring block is not available (e.g. at the frame boundary) the neighbouring samples are considered as 'not available' for reference. In such cases, a default value is used instead of the neighbouring sample values. Typically, the default value (or 'half-tone') is equal to half of the range implied by the bit-depth. For example, when the video encoder 114 is configured for a bit-depth of eight (8), the default value is 128. The summation module 342 sums the prediction unit (PU) 382 from the multiplexer module 340 and the spatial domain output of the multiplexer 382. The intra-frame prediction module 336 also produces an intra-prediction mode 380 which is sent to the entropy encoder 324 for encoding into the encoded bitstream 312.

An intra block copy module 350 tests various block vectors to produce an optimal reference block for the prediction unit (PU) 382, which may be referred to as intra block copied prediction units. The reference block includes a block of samples 370 obtained from the current coding tree block (CTB) and/or the previous coding tree block (CTB). The reference block cannot include samples from any coding blocks (CBs) in the current coding tree block (CTB) that have not yet been decoded (and hence are not available in the samples 370). A block vector is a two-dimensional vector specifying the location of a reference block relative to the location of the currently considered prediction unit (PU). The block vector includes a horizontal component (i.e. 'X component') and a vertical component (i.e. 'Y component'). The intra block copy module 350 may test every valid block vector by conducting a search using a nested loop. Faster searching methods are also possible. The intra block copy module 350 may reduce the search complexity by only searching for block vectors aligned horizontally or vertically to the current coding block (CU), near-horizontal and near-vertical block vectors may also be searched. The intra block copy module 350 may test a spatially sparse set of block vectors and then perform a refined search in the neighbourhood of the optimal one of the sparse block vectors to produce a final block vector.

Entropy coding the block vector has an associated cost, or rate. One approach to entropy coding the block vector is to reuse the motion vector delta (i.e. 'mvd_coding') syntax structure. This syntax structure permits encoding a two-dimensional signed vector and is thus suitable for a block vector. The block vector may be coded directly into the bitstream using the motion vector delta syntax structure. Alternatively, correlations between adjacent block vectors may be exploited. For example, the delta (difference) between the block vector of successive blocks when performing an intra block copy operation may be coded into the encoded bitstream 312. A 'delta block vector' is a two-dimensional vector that includes a horizontal component and a vertical component. The delta block vector is the difference between a 'predictor block vector' and the intended block vector for the current prediction unit (PU). In such cases, the decoder can reconstruct the block vector for a given prediction unit (PU) by adding the 'decoded delta block' vector to the predictor block vector. The predictor block vector is typically the block vector of the previous prediction unit (PU) to use intra block copy mode. Finally, an 'intra_bc_flag' syntax element signals that a given coding block (CB) uses the intra block copy mode. The mvd_delta syntax structure encodes smaller magnitude vectors more compactly than larger magnitude vectors. Consequently, in the rate measurement, a bias towards selecting nearby reference blocks is introduced. A given block vector results in a particular reference block having a particular distortion. The rate-distortion trade-off is applied to determine the optimal block vector for an intra block copy mode. An overall rate distortion trade-off may compare the result for the intra block copy mode with the result for other prediction methods, such as inter-prediction and intra-prediction.

Prediction units (PUs) may be generated using either an intra-prediction, an inter-prediction or an intra-block copy method. Intra-prediction methods make use of data samples adjacent to the prediction unit (PU) that have previously been decoded (typically above and to the left of the prediction unit) in order to generate reference data samples within the prediction unit (PU). Various directions of intra-prediction are possible (33 directions in total); additionally, a 'DC mode' and a 'planar mode' are supported, for a total of thirty-five (35) possible intra-prediction modes. Inter-prediction methods make use of a motion vector to refer to a block from a selected reference frame. The motion estimation module 338 and motion compensation module 334 operate on motion vectors 374, having a precision of one quarter (¼) of a luma sample, enabling precise modelling of motion between frames in the frame data 310. The decision on which of the intra-prediction, the inter-prediction or the intra block copy method to use is made according to a rate-distortion trade-off. The trade-off is made between the desired bit-rate of the resulting encoded bitstream 312 and the amount of image quality distortion introduced by either the intra-prediction or inter-prediction method. If intra-prediction is used, one intra-prediction mode is selected from the set of possible intra-prediction modes, also according to a rate-distortion trade-off. The multiplexer module 340 may select either the intra-predicted reference samples 378 from the intra-frame prediction module 336, or the inter-predicted prediction unit (PU) 376 from the motion compensation block 334.

The summation module 342 produces a sum 370 that is input to a de-blocking filter module 330. The de-blocking filter module 330 performs filtering along block boundaries, producing de-blocked samples 372 that are written to the frame buffer module 332 configured within the memory 206. The frame buffer module 332 is a buffer with sufficient capacity to hold data from one or more past frames for future reference as part of a reference picture list.

For the high efficiency video coding (HEVC) standard, the encoded bitstream 312 produced by the entropy encoder 324 is delineated into network abstraction layer (NAL) units. Frames are encoded using one or more 'slices'. Two types of slice are defined, 'independent slice segments' and 'dependent slice segments'. Generally, each slice of a frame is contained in one NAL unit. The entropy encoder 324 encodes the transform coefficients 364, the intra-prediction mode 380, the motion vectors (or motion vector differences) and other parameters, collectively referred to as 'syntax elements', into the encoded bitstream 312 by performing a context adaptive binary arithmetic coding (CABAC) algorithm. Syntax elements are grouped together into 'syntax structures'. The groupings may contain recursion to describe hierarchical structures. In addition to ordinal values, such as an intra-prediction mode or integer values, such as a motion vector, syntax elements also include flags, such as to indicate a quad-tree split.

The video encoder 114 also divides a frame into one or more 'tiles'. Each tile is a rectangular set of coding tree blocks (CTBs) that may be encoded and decoded independently, facilitating parallel implementations. Within each tile, coding tree blocks (CTBs) are scanned in a raster order and a single core (or thread) implementation scans the tiles in raster scan order. To enable parallel implementation, intra-prediction of blocks along a tile boundary may not use samples from blocks in a neighbouring tile. As such, the neighbouring samples are marked as not available for intra-prediction (even though the sample values do exist).

Although the video decoder 134 of FIG. 4 is described with reference to a high efficiency video coding (HEVC) video decoding pipeline, other video codecs may also employ the processing stages of modules 420-434. The encoded video information may also be read from memory 206, the hard disk drive 210, a CD-ROM, a Blu-ray Disk™ or other computer readable storage medium. Alternatively the encoded video information may be received from an external source, such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-ray Disk™ or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. Context information for the entropy decoder module 420, e.g. for the adaptation parameters, is provided by a context memory 419 (or 'local memory store' in the video decoder 134), generally configured within the memory 206. By virtue of the operation of the entropy decoder 420 and the entropy encoder 324, the contents of the context memory 419 track the contents of the context memory 325. The decoded syntax elements are used to reconstruct parameters within the video decoder 134. Parameters include zero or more residual data array 450, motion vectors 452 (motion vector differences are decoded from the encoded bitstream 312 and from these, the motion vectors 452 are derived), a prediction mode 454. The residual data array 450 is passed to a dequantiser module 421, the motion vectors 452 are passed to a motion compensation module 434, and the prediction mode 454 is passed to an intra-frame prediction module 426 and to a multiplexer 428.

The dequantiser module 421 performs inverse scaling on the residual data of the residual data array 450 to create reconstructed data 455 in the form of transform coefficients. The dequantiser module 421 outputs the reconstructed data 455 to an inverse transform module 422. The inverse transform module 422 applies an 'inverse transform' to convert the reconstructed data 455 (i.e., the transform coefficients) from a frequency domain representation to a spatial domain representation, outputting a residual sample array 456 via a multiplexer module 423. The inverse transform module 422 performs the same operation as the inverse transform module 328. The inverse transform module 422 is configured to perform an inverse transform. The transforms performed by the inverse transform module 422 are selected from a predetermined set of transform sizes required to decode an encoded bitstream 312 that is compliant with the high efficiency video coding (HEVC) standard.

The motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU). The inter-prediction prediction unit (PU) 462 is a prediction of output decoded frame data based upon previously decoded frame data. When the prediction mode 454 indicates that the current prediction unit (PU) was coded using intra-prediction, the intra-frame prediction module 426 produces an intra-predicted prediction unit (PU) 464 for the prediction unit (PU). The intra-prediction prediction unit (PU) 464 is produced using data samples spatially neighbouring the prediction unit (PU) and a prediction direction also supplied by the prediction mode 454. The spatially neighbouring data samples are obtained from a sum 458, output from a summation module 424. An intra block copy module 436 produces a block of reference samples 438, by copying an array of samples from the current and/or the previous coding tree blocks (CTBs). The offset of the reference samples is calculated by adding a block vector (decoded by the entropy decoder 420) to the location of the current coding block (CB) within the current coding tree block (CTB). The multiplexer module 428 selects the intra-predicted prediction unit (PU) 464 or the inter-predicted prediction unit (PU) 462 for a prediction unit (PU) 466 or a reference block 438 from the intra block copy module 436, depending on the current prediction mode 454. The prediction unit (PU) 466, which is output from the multiplexer module 428, is added to the residual sample array 456 from the inverse scale and transform module 422 by the summation module 424 to produce sum 458. The sum 458 is then input to each of a de-blocking filter module 430, the intra-frame prediction module 426 and the intra block copy module 436. The de-blocking filter module 430 performs filtering along data block boundaries, such as transform unit (TU) boundaries, to smooth visible artefacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

Figure 5A:
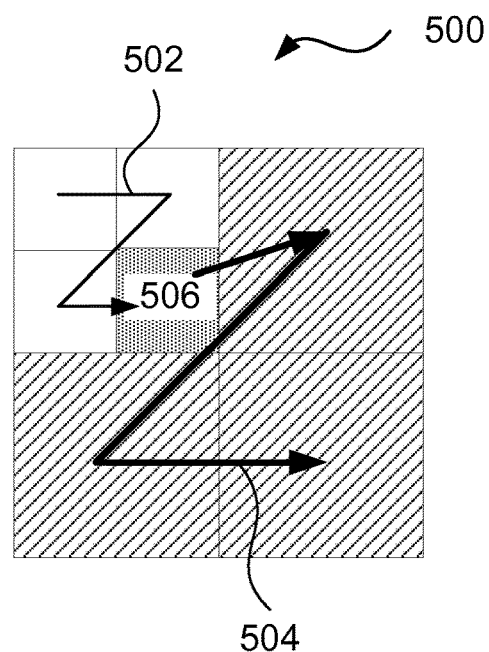
FIG. 5A is a schematic block diagram showing an example 'Z-scan' order for scanning coding blocks (CBs) within a coding tree block (CTB)

FIG. 5A is a schematic block diagram showing an example 'Z-scan' order for scanning coding blocks (CBs) within a coding tree block (CTB) 500. At each level of a hierarchical decomposition of the coding tree block (CTB) 500, a scan resembling a 'Z' is performed, i.e. from left to right, and then from top to bottom. The scans are applied recursively in a depth-first manner. In the example of FIG. 5A, four coding blocks (CBs) in a top-left of the coding tree block (CTB) 500 are scanned as in a Z-scan order (e.g. 502), reaching a coding block (CB) 506 that is currently being processed in the example of FIG. 5A. The remainder of the coding tree block (CTB) 500 is scanned according to Z-scan order 504. The samples from previously decoded coding blocks (CBs) in the coding tree block (CTB) 500 are available for intra-prediction. The samples from the coding blocks (CBs) that have not yet been decoded by the video decoder 134 are not available for intra-prediction and are illustrated with diagonal hatching in FIG. 5A. As such, the video encoder 114 also treats the samples from the coding blocks (CBs) that have not yet been decoded as not being available for intra-block copy.

Figure 5B:
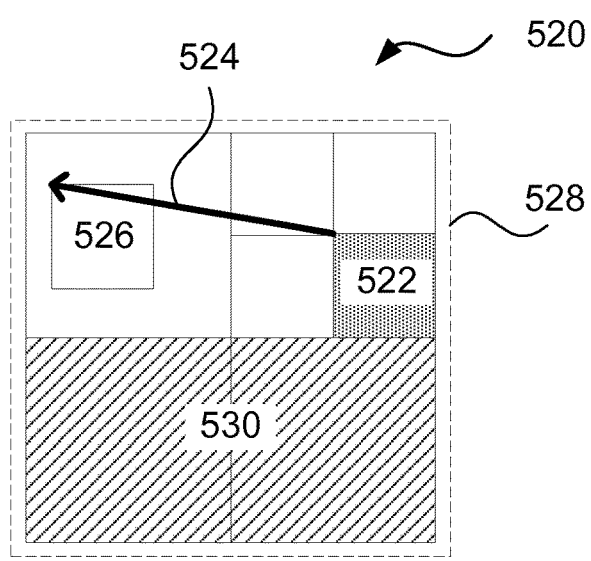
FIG. 5B is a schematic block diagram showing an example intra block copy operation.

FIG. 5B is a schematic block diagram showing an example intra block copy operation. In the example intra block copy operation, coding block (CB) 522 is configured to use intra block copy mode. A block vector 524 references a reference block 526 of samples relative to a top-left sample position of the coding block (CB) 522 in a current coded tree block (CTB) 528 used to reconstruct coding block (CB) 522. In the example of FIG. 5B, region 530 of the current coded tree block (CTB) 528 have not yet been decoded because the region 530 are subsequent to the coding block (CB) 522 in the Z-scan order. The region 530 is thus not available for referencing. In the example of FIG. 5B, the reference block 526 is contained entirely within current coding tree block (CTB) 528, where a previous coding tree block (CTB) is not shown. The memory capacity of the intra block copy module 350 in the video encoder 114 and the intra block copy module 436 in the video decoder 134 is sufficient to hold luma and chroma samples of two coding tree blocks (CTBs), with a coding tree block (CTB) size configured as 64×64 luma samples and corresponding dimensions for chroma in accordance with the selected chroma format.

Figure 6A:
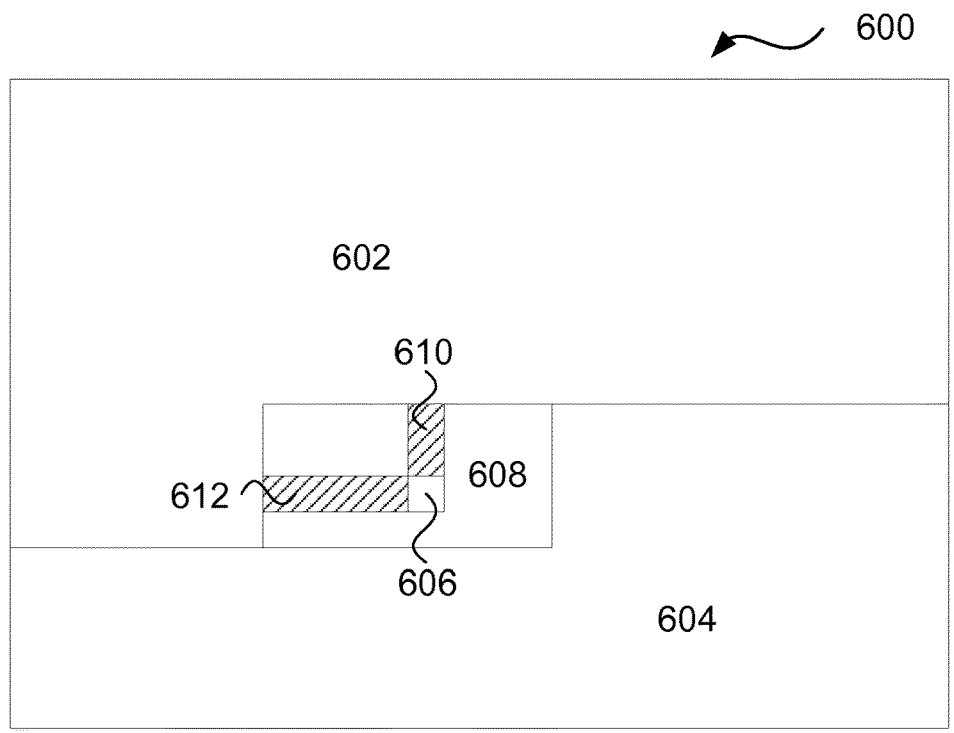
FIG. 6A is a schematic block diagram showing a local search area for intra block copy in the video encoder.

FIG. 6A is a schematic block diagram showing a local search area for a prediction unit (PU) 606 using intra block copy mode in the video encoder 114. When a local search area is used, block vectors values are smaller because each reference block is selected from within the local search area. In FIG. 6A, a frame 600 is reconstructed by adding prediction units (PUs) and transform units (TUs). An encoder search range for the prediction unit (PU) 606 is defined as the region within which reference blocks for intra block copy are selected.

A local search area corresponds to a highly localised encoder search range (e.g. two coding tree blocks (CTBs)), as shown in FIG. 6A as a region 608. The region 608 is located above the prediction unit (PU) 606. Within the region 608, only reconstructed samples are available for reference, so samples from coding units that are not yet reconstructed are not available for reference. Within the frame 600, the reconstructed samples 602 are not tested by the video encoder 114, even though the video decoder 134 is capable of using the samples 602 as reference samples for intra block copy. The samples 604 are not yet reconstructed and thus are not available as reference samples for intra block copy. A frame is divided into one or more 'slices' and one or more 'tiles'. For a given prediction unit (PU), only reference samples belonging to the same slice and the same tile are available for use by that prediction unit (PU).

As seen in FIG. 6A, frame 600 has one slice and one tile, so no further limitation of the search area is imposed in the frame 600. When testing intra block copy mode for a prediction unit (PU), e.g. prediction unit 606, multiple candidate reference blocks are tested. For each tested reference block, the cost of coding the block (i.e. the cost of coding the block vector or delta block vector required to identify candidate reference block) is measured. The difference between the reference block and original samples in the frame data 310 (see FIG. 3) collocated with the prediction unit (PU) 606 is measured, generally by using a 'sum of absolute differences' (SAD) method, due to low computational overhead. The cost of coding the block and the difference between the reference block and original samples in the frame data 310 are combined using a lambda value to create a single measure referred to as a 'rate-distortion (RD) cost'. Then, of the candidate blocks, the block corresponding to a lowest RD cost is selected. As block vectors are resolved to a unit-sample accuracy, the number of possible block vectors within the search area is very large.

Testing each possible block vector is generally considered too computationally expensive to perform in the video encoder 114. To increase the speed of the search, in one arrangement the video encoder 114 employs a 'fast search' algorithm. One such fast search algorithm is known as a '1D search'. A 1D search tests blocks above the prediction unit (PU) 606, for example, by testing each possible block in a region 610 that is bounded by a local search area. The region 610 is located to the left of the prediction unit (PU) 606. Then, the 1D search tests blocks to the left of the prediction unit (PU) 606, for example, by testing each possible block in a region 612 that is also bounded by the local search area. The highly localised nature of the block access permits caching methods to be used. For example, by retaining reconstructed samples within the local search area in on-chip memory, external memory usage for intra block copy can be avoided altogether.

For some block sizes, such as 8×8, a hashing method may be combined with a search method, such as the local search described above with reference to FIG. 6A, to increase the effective search area. In such search methods, each time a block is tested a hash is determined on the block contents. A hash function is defined such that the hash value has some relation with the block contents. For example, a coarsely quantised measure of average intensity and sample intensity gradient within the block is one method to produce a hash value. Blocks having like hash values may be grouped together using lists. For the prediction unit (PU) 606, any previously encountered blocks in the frame having the same hash value may be tested. Blocks having matching hash values, where the hash function used to produce the hash value is a function of the block structure, are more likely to provide competitive candidates. As blocks having matching hash values may be located anywhere within the frame 600, the search effectively provides frame-level scope, even though a local search area is used for testing blocks that are added to the hash lists.

Figure 6B:
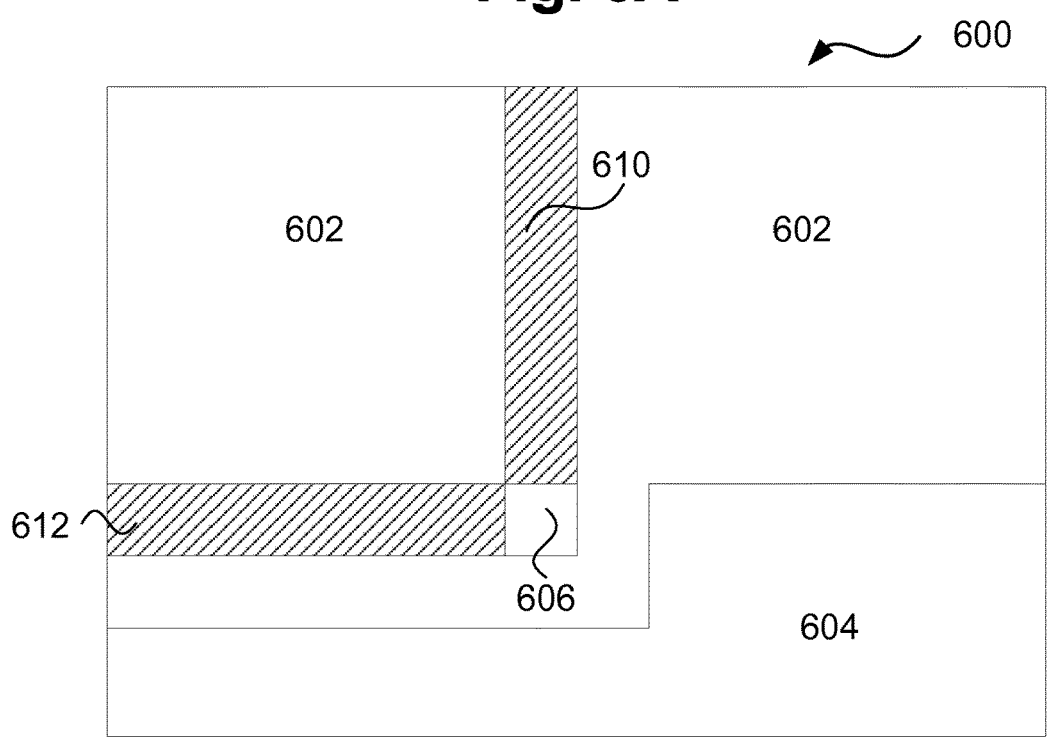
FIG. 6B is a schematic block diagram showing a full-frame search area for intra block copy in the video encoder.

FIG. 6B is a schematic block diagram showing a full-frame search area for intra block copy in the video encoder 114. In the example of FIG. 6B, the search area extends to a top border of the frame 600 for region 610 and to a left border of the frame 600 for the region 612. As such, a wider set of candidate reference blocks is available in the example of FIG. 6B. Using a full-frame search area for intra block copy improves compression efficiency, at the expense of increased memory bandwidth because the selected reference block is selected from reference blocks located in a wider area, such as the full frame 600.

Figure 7A:
FIG. 7A is a table showing codewords for a kth order exponential binarisation.

FIG. 7A is a table 700 showing codewords for a kth order Exponential Golomb binarisation. Each codeword of the kth order binarisation of table 700 consists of a unary prefix and a binary suffix. To distinguish the prefix and suffix of each codeword, the prefix and suffix of each codeword in the table 700 are separated using a space. A unary prefix includes zero or more symbols of value 'one' followed by one symbol of value 'zero' to terminate the unary code. An optional suffix part is present in each codeword. The length of the suffix in each codeword is equal to the value 'k' plus the number of 'one' symbols in the prefix part of the corresponding codeword. As shown in table 700, within each suffix a binary code is used to encode each remaining magnitude value, and when no further codes are available, the prefix length increases by one. In the table 700, the minimum codeword length (i.e. remaining magnitude equal to zero) increases for larger values. The rate of increase of codeword length as the remaining magnitude increases is less for larger Rice parameter values than for smaller 'k' values. Thus, the 'k' value provides a means for adaptation to the distribution of values of delta block vector values.

Figure 7B:
FIG. 7B is a table showing codewords for a binarisation of remaining magnitudes for residual coefficients for several Rice parameter values.

FIG. 7B is a table 710 showing codewords for a binarisation of remaining magnitudes for residual coefficients for several Rice parameter values. Remaining magnitudes are encoded using a syntax element named 'coeff_abs_level_remaining'. Binarisation of coeff_abs_level_remaining includes a truncated Rice prefix and an optional kth order Exponential Golomb suffix. In the table 710, for each codeword shown, a space is used to distinguish the truncated Rice prefix from the optional kth order Exponential Golomb codeword. The value of the remaining magnitude is the magnitude of the residual coefficient less any signalling flags associated with the residual coefficient. For example, a flag signalling that a residual coefficient is significant implicitly signals that the magnitude is at least one. Then, if the residual coefficient value is six, the remaining magnitude is five.

The table 710 shows the binarisations of coeff_abs_level_remaining for remaining magnitudes of value zero (0) to fourteen (14) with Rice parameter values from zero (0) to two (2). Binarisation logic for the table 710 is present in the video encoder 114 and the video decoder 134 for residual coefficients. Logic or software code used to implement the video encoder 114 and the video decoder 134 can be reused for other purposes with minimal increase in complexity (i.e. just switching or multiplexing or a conditional function call may be necessary to reuse the logic or function). In the table 710, the minimum codeword length (i.e. remaining magnitude equal to zero) increases for larger Rice parameter values. The rate of increase of codeword length as the remaining magnitude increases is less for larger Rice parameter values than for smaller Rice parameter values. Thus, the Rice parameter provides a means for modifying the distribution of values of the residual coefficient, or delta block vector values. The binarisation for coeff_abs_level_remaining consists of a Truncated Rice prefix and an (optional) kth order exponential golomb suffix. A truncated Rice prefix consists of a truncated unary prefix and an (optional) binary suffix. The truncated unary prefix is generally limited to three bins in length, so valid codewords are '0', '10', '110' and '111'. The binary suffix length is equal to the Rice parameter value minus one, and the binary suffix is only coded if the truncated unary prefix is not truncated (i.e. for codewords '0', '10' and '110' but not for '111'). The kth order exponential golomb suffix is binarised as described in FIG. 7A.

Figure 8:
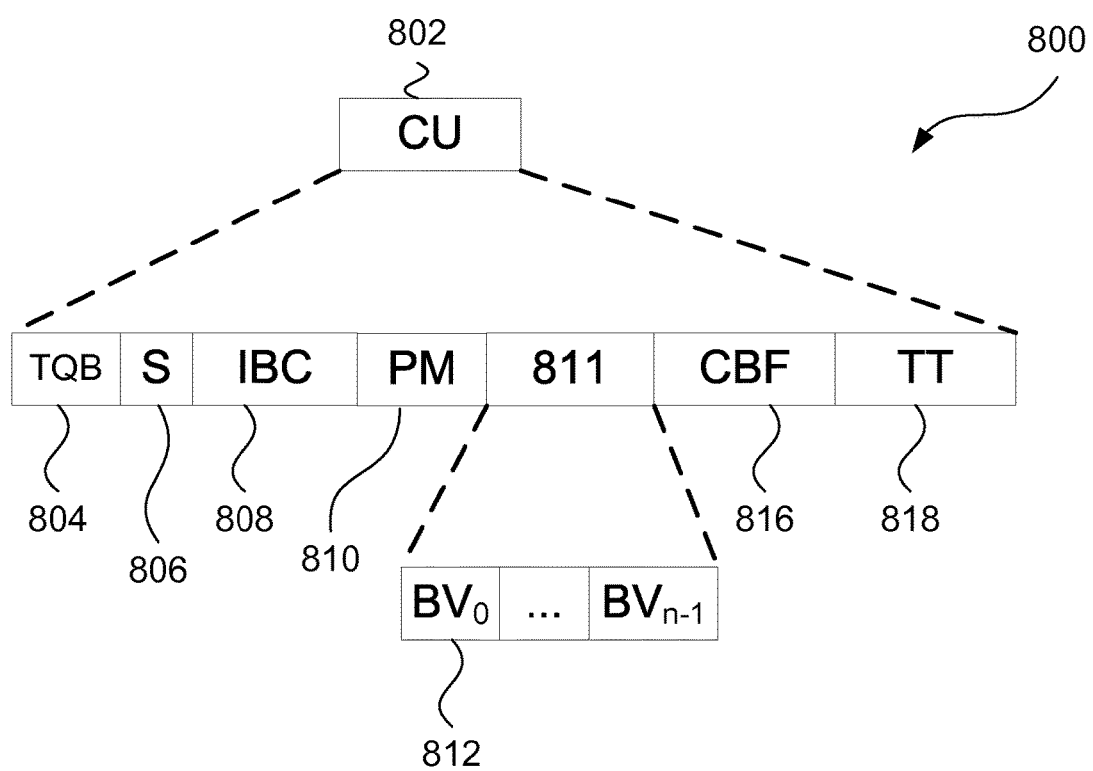
FIG. 8 is a schematic block diagram showing a coding unit (CU) syntax structure within a bitstream portion.

FIG. 8 is a schematic block diagram showing a coding unit (CU) syntax structure 802 within a bitstream portion 800. The coding unit (CU) syntax structure 802 describes the structure of one coding unit (CU). The coding unit (CU) syntax structure 802 can also invoke other syntax structures to describe the structure of other entities included in a coding unit (CU). For example, the residual quad-tree (RQT) of a coding unit (CU) is described by one or more transform tree syntax structures and one or more transform unit (TU) syntax structures. The coding unit (CU) syntax structure 802 is applicable when a coding unit (CU) is implicitly split into four prediction units (PUs) (i.e. partition mode of PART_N× N). Implicit splitting means that there is no syntax element to select a partition mode out of multiple possible partition modes. Particular syntax elements may be omitted from coding for a given instance of a coding unit (CU) syntax structure. For example, syntax elements relating to inter-prediction are not present in a coding unit (CU) syntax structure within a slice configured to only use intra-prediction. The coding unit (CU) syntax structure 802 may be used in cases where the intra block copy function is available and in use.

As shown in FIG. 8, the coding unit (CU) syntax structure 802 includes syntax elements and syntax structures (e.g. 804 to 818). A transquant bypass flag 804 ('cu_transquant_bypass_flag') signals the use of a 'transform quantisation bypass' mode for the coding unit (CU). The transquant bypass flag 804 is only present if a 'transquant_bypass_enabled_flag', present in the high level syntax was true. The transquant bypass flag 804 is signalled independently of whether intra block copy is enabled, thus intra block copy mode is available in both the lossless and lossy coding cases.

A skip flag 806 ('cu_skip_flag') is present in the encoded bitstream 312 for coding units (CUs) in slices supporting the use of inter-prediction. The skip flag 806 indicates that the coding unit (CU) includes an inter-predicted prediction units (PUs) and that no residual or motion vector difference is present in the encoded bitstream 312 for the prediction unit (PU) associated with the corresponding coding unit (CU). In such a case, a prediction unit (PU) syntax structure is included. When the prediction unit (PU) is configured to use a 'merge mode', a syntax element in the prediction unit (PU) syntax structure signals from which neighbouring prediction unit (PU) a motion vector for the current prediction unit (PU) will be derived. When the skip flag 806 indicates the use of skipping the coding unit (CU), no further syntax elements are included by the coding unit (CU) syntax structure. As such, an efficient means of representing coding units (CUs) in the encoded bitstream 312 is available, usable in cases where no residual is required (i.e. the inter-predicted reference block is very close or identical to the corresponding portion of the frame data 310). When the coding unit (CU) is not skipped, additional syntax elements are introduced by the coding unit (CU) syntax structure 802 to further specify the configuration of the coding unit (CU).

As seen in FIG. 8, an intra block copy flag 808 signals the use of the intra block copy mode for the coding unit (CU) corresponding to the structure 800. The intra block copy flag 808 is encoded only when an 'intra_block_copy_enabled_flag' is true.

A partition mode 810 encodes the selected partition mode for the coding unit corresponding to the structure 800. Available partition modes include PART_2N×2N, PART_N×N, PART_2N×N and PART_N×2N. A set of 'asymmetric motion partition' partition modes is also available for inter-prediction, providing unequal division of a coding unit (CU). Such partition modes divide the coding unit horizontally or vertically into a pair of prediction units (PUs) occupying one-quarter and three-quarters of the coding unit (CU). The asymmetric motion partitions are named PART_2NxnU, PART_2NxnD, PARTnLx2N and PART_nrx2N. The 'intra_block_copy_enabled_flag' is encoded as high level syntax.

If the intra block copy mode is in use, delta block vectors 811 are present in the encoded bitstream 312. The delta block vectors 811 include one or more delta block vectors, such as delta block vector 812. Each delta block vector is associated with one prediction unit (PU). Each delta block vector encodes the difference between the block vector of a previous prediction unit (PU) to use intra block copy mode and the block vector of a current prediction unit (PU). The previous prediction unit (PU) can be the previous prediction unit (PU) in the Z-scan order to use intra block copy mode. Alternatively, the previous prediction unit (PU) can be a prediction unit (PU) located either to the left of, or above, the current prediction unit (PU). In such a case, a flag is signalled to specify which of the left or above prediction units (PUs) is used to provide the predictor for the current prediction unit (PU).

Arrangements of the video encoder 114 and the video decoder 134 supporting a PART_N×N partition mode for coding units (CUs) configured to use the intra block copy mode have four delta hock vectors present within the delta block vectors 812. Each delta block vector is a multi-dimensional vector that includes a horizontal and a vertical offset (or 'component'). The absolute spatial location (i.e. relative to the corner of a frame) of the reference block in a frame is identified by determining the vector sum of the location of the current prediction unit (PU) and the predictor and the delta block vector. One method of coding a delta block vector in the encoded bitstream 312 is to reuse a pre-existing syntax structure, e.g. a 'motion vector difference' syntax structure, to encode the horizontal and vertical offsets in the encoded bitstream 312.

A root coded block flag 816 (or 'rqt_root_cbf') signals the presence of residual data within the coding unit (CU) corresponding to the structure 800. If the flag 816 has a value of zero, no residual data is present in the coding unit (CU). If the flag 816 has a value of one, there is at least one significant residual coefficient in the coding unit (CU) and hence a residual quad-tree (RQT) exists in the coding unit (CU). In such cases, a transform tree 818 syntax structure encodes the uppermost hierarchical level of the residual quad-tree (RQT) in the encoded bitstream 312. Additional instances of transform tree syntax structures and transform unit syntax structures are present in the transform tree 818 syntax structure, in accordance with the residual quad-tree hierarchy of the coding unit (CU).

Figure 9A:
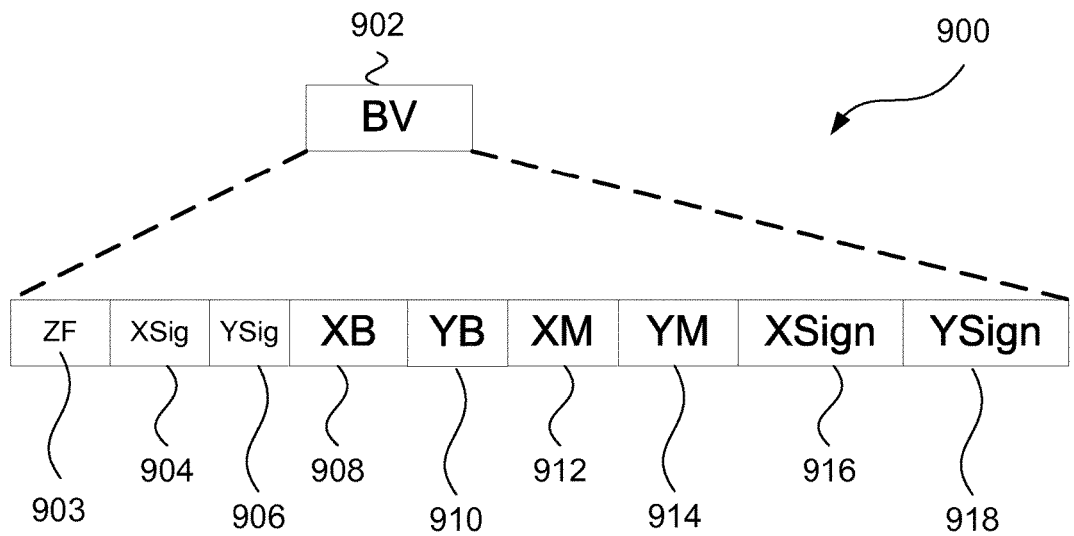
FIG. 9A is a schematic block diagram showing a block vector delta syntax structure within a bitstream portion.

FIG. 9A is a schematic block diagram showing a block vector delta syntax structure 900 within a bitstream portion 902. The syntax structure 900 is used for the block vector delta of each prediction unit (PU) of a coding unit (CU). The syntax structure 900 enables coding a block vector delta such that the binarisation method applied to code the magnitude is selectable via a flag that is also present in the encoded bitstream 312. As such, the binarisation method is selected by the video encoder 114.

As seen in FIG. 9A, a zero delta block vector flag 903 signals that each component of the delta block vector has a value of zero.

An X significant flag 904 signals that the X component of the delta block vector is significant (i.e. non-zero). The X significant flag 904 is coded using a context coded bin.

A Y significant flag 906 signals that the Y component of the delta block vector is significant (i.e. non-zero). The Y significant flag 906 is coded using a content coded bin.

An XB flag 908 signals the binarisation method to be used for an X magnitude codeword 912. The XB flag is coded using a context coded bin. The XB flag signals one of two possible methods for binarisation of the magnitude of the X component of the delta block vector. One binarisation method is used for localised components. The binarisation method used for localised components provides shorter codewords for low values, at the expense of longer codewords for larger values (e.g. values larger than those produced when a local search area is used in the video encoder 114). An example of such a binarisation method is an exponential-golomb code of order 1 (i.e. k=1).

A second binarisation method is used for non-localised components. The second binarisation method provides longer codewords for low values, but an increase in codeword length for higher values is less than the increase of the first binarisation method is used for localised components.

One example of the second binarisation method used for non-localised components is an exponential-golomb code of order 4 (i.e. k=4). The video encoder 114 is able to select either the first or second binarisation method for a given component of the delta block vector, and is able to select between binarisation methods independently for each component of the delta block vector. A context bin is used to encode the selected binarisation method (i.e. for the XB flag 908 and the YB flag 910). Thus, the video encoder 114 can choose to use one binarisation method. In such a case, adaptation of the CABAC engine in the entropy encoder 324 results in the cost of the XB flag 908 and the YB flag 910 in the encoded bitstream 312 being minimal.

Finally, the X component sign 916 and the Y component sign 918 are present in the encoded bitstream. The X component sign 916 and the Y component sign 918 are coded using bypass bins (i.e. no context is used) because the distribution of positive and negative values is close to equal probability, so context coding is not beneficial.

Figure 9B:
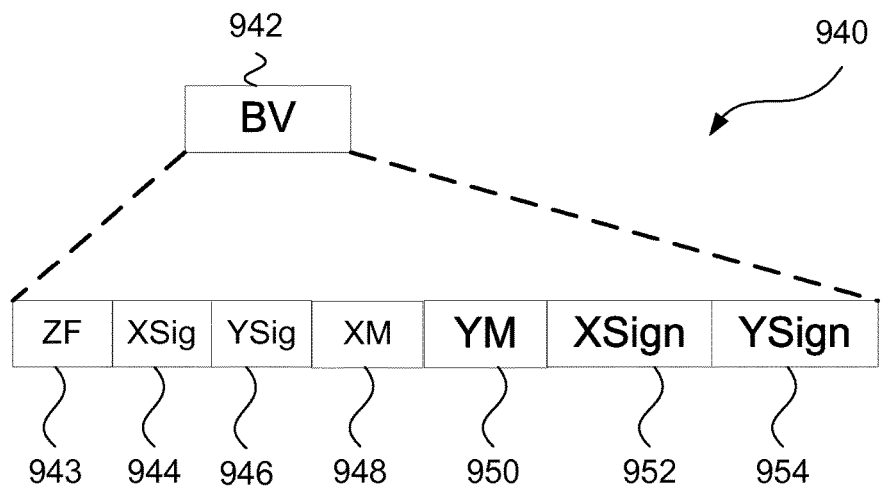
FIG. 9B is a schematic block diagram showing an alternative block vector delta syntax structure within a bitstream portion.

FIG. 9B is a schematic block diagram showing a block vector delta syntax structure 940 within a bitstream portion 942. The syntax structure 940 is used for the block vector delta of each prediction unit (PU) of a coding unit (CU). The syntax structure 940 enables coding a block vector delta such that the magnitude is encoded using an adaptation parameter, such as a Rice parameter. The adaptation parameter is adapted according to the magnitude in order to provide automatic adaptation to the statistics of the block vector deltas to be encoded into the encoded bitstream 312. Such statistics depend on the type of search performed by the video encoder 114 (i.e. local search area or full frame search area) and as such, experiments show that the ability to adapt to the search area provides a coding efficiency benefit.

As seen in FIG. 9B, a zero delta block vector flag 943 signals that each component of the delta block vector has a value of zero.

An X significant flag 944 signals that the X component of the delta block vector is significant (i.e. non-zero). The X significant flag 944 is coded using a context coded bin.

A Y significant flag 946 signals that the Y component of the delta block vector is significant (i.e. non-zero). The Y significant flag 946 is coded using a content coded bin. If the X component is significant then an X magnitude codeword 948 encodes the magnitude of the X component, using an adaptive codeword method such as the method used for coeff_abs_level_remaining in the residual coding. The adaptive method requires an adaptation parameter, such as a Rice parameter to binarise a given magnitude. If the Y component is significant then a Y magnitude codeword 950 encodes the magnitude of the Y component, using an adaptive codeword method such as the method used for coeff_abs_level_remaining in the residual coding. The adaptive method requires an adaptation parameter, such as a Rice parameter to binarise a given magnitude. The X component sign 952 and the Y component sign 954 are coded using bypass bins (i.e. no context is used) because the distribution of positive and negative values is close to equal probability, so context coding is not beneficial.

Figure 10:
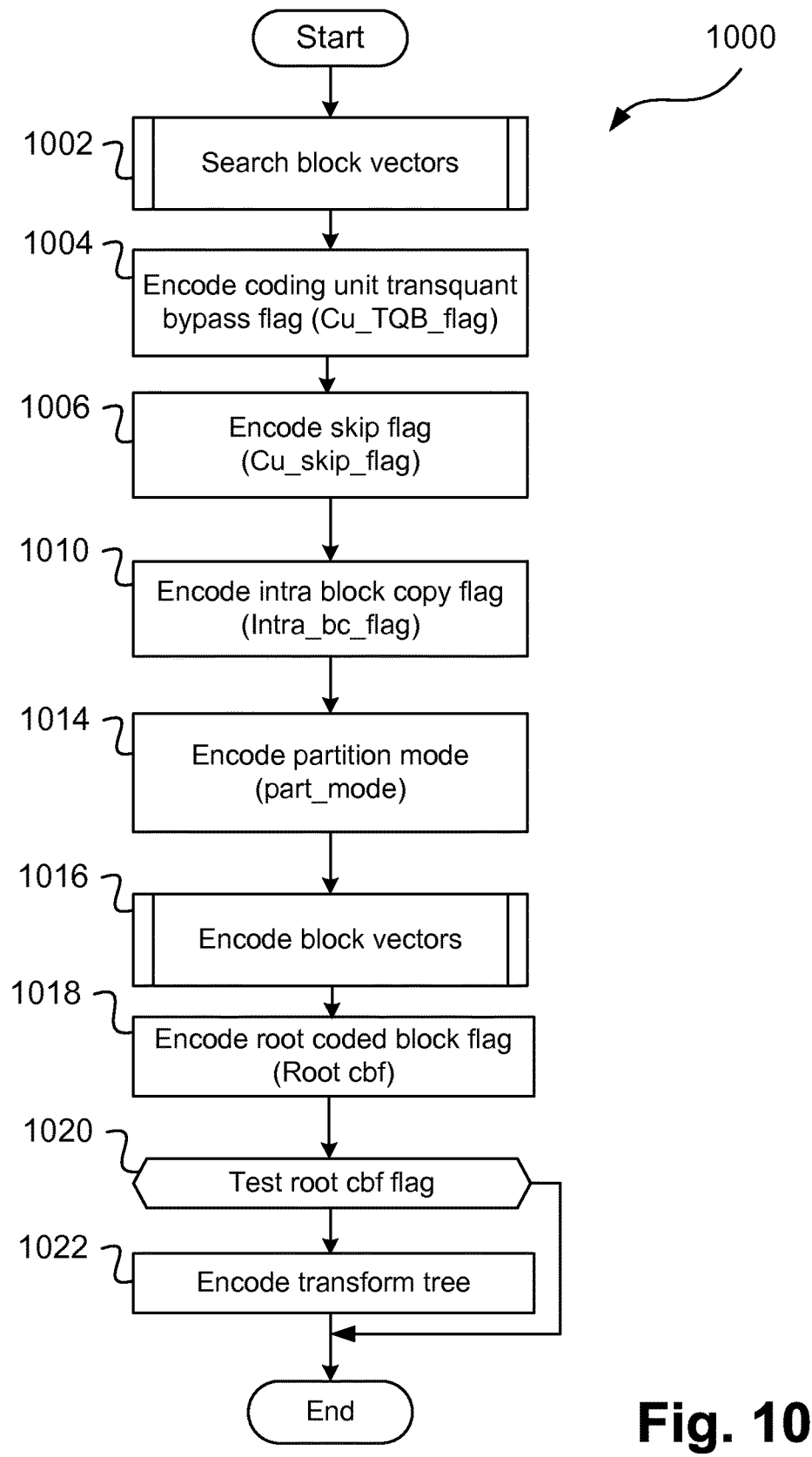
FIG. 10 is a schematic flow diagram showing a method of encoding a coding unit (CU) using intra block copy mode.

FIG. 10 is a schematic flow diagram showing a method 1000 for encoding a coding unit (CU) using intra block copy mode. The method 1000 may be implemented as one or more software code modules implementing the video encoder 114, which are resident in the hard disk drive 210 and are controlled in their execution by the processor 205.

At a search block vectors step 1002, the intra block copy module 350, under control of the processor 205, determines a block vector for each prediction unit (PU) in a coding unit (CU). The block vectors may be stored in the memory 206. A method 1100 for searching block vectors for intra block copy mode, as executed at the search block vectors step 1002, is described in detail below with reference to FIG. 11.

At an encode coding unit transquant bypass flag step 1004, the entropy encoder module 324, under control of the processor 205, encodes the transquant bypass flag 804 into the encoded bitstream 312. The encoded bitstream 312 may be stored in the memory 206.

At an encode skip flag step 1006, the entropy encoder 324, under control of the processor 205, encodes the skip flag 806 into the encoded bitstream 312.

At an encode intra block copy flag step 1010, the entropy encoder 324, under control of the processor 205, encodes the intra block copy flag 808 into the encoded bitstream 312.

At an encode partition mode step 1014, the entropy encoder 324, under control of the processor 205, encodes the partition mode 810 into the encoded bitstream 312.

At an encode block vectors step 1016, the entropy encoder 324, under control of the processor 205, encodes the delta block vectors 811 into the encoded bitstream 312. Two methods for binarising the delta block vectors, as performed in the step 1016, are described below with reference to FIGS. 11 and 12.

At an encode root coded block flag step 1018, the entropy encoder 324, under control of the processor 205, encodes the root coded block flag 816 into the encoded bitstream 312.

At an encode transform tree step 1022, the entropy encoder 324, under control of the processor 205, encodes the transform tree 818 into the encoded bitstream 312. Step 1022 is performed if the root coded block flag 816 of the step 1018 indicates the presence of significant residual coefficients for one or more transform units (TUs) within the residual quad-tree (RQT). The method 1000 then terminates.

Figure 11:
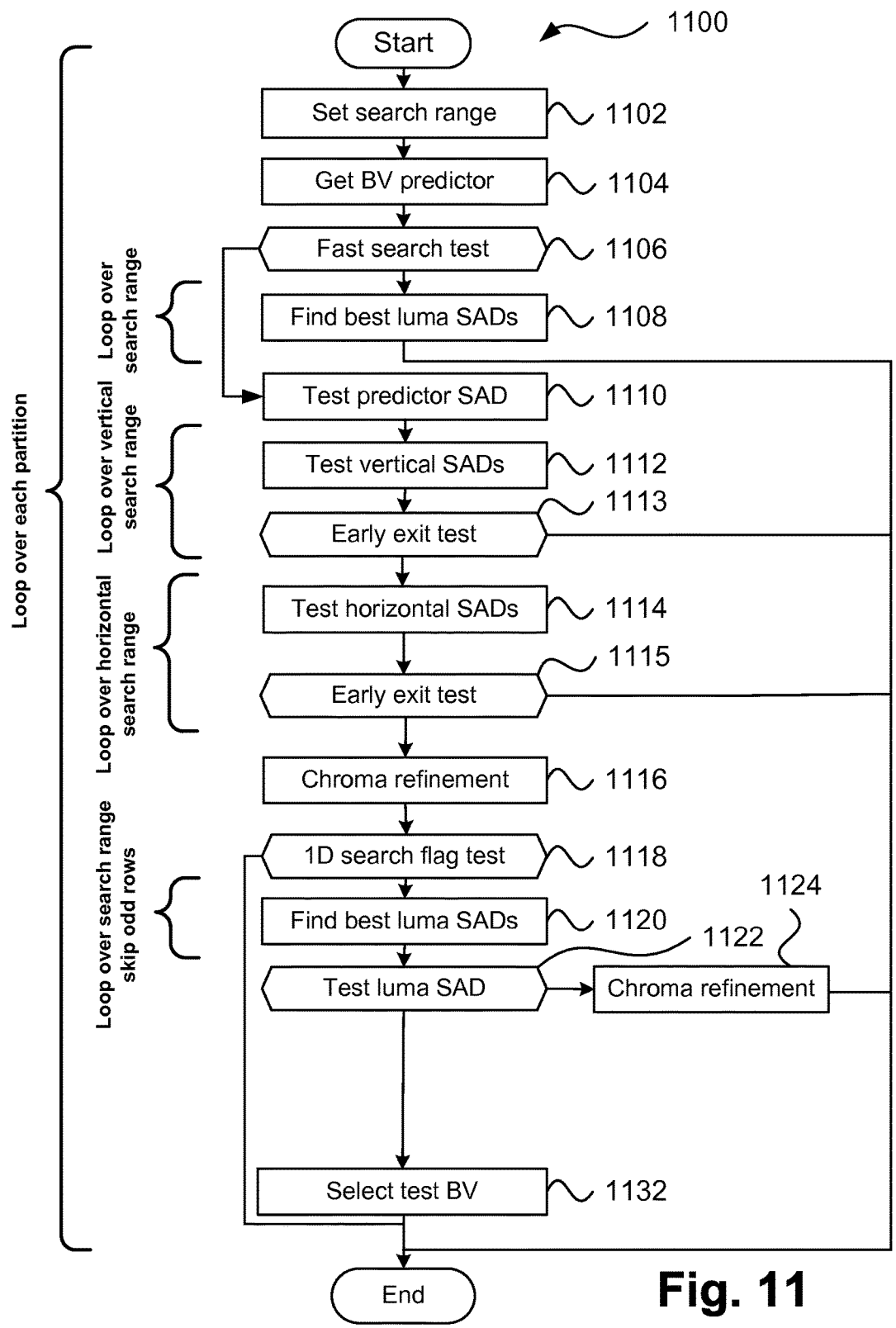
FIG. 11 is a schematic flow diagram showing a method of searching block vectors for intra block copy mode.

FIG. 11 shows the method 1100 for searching block vectors for intra block copy mode, as executed at step 1002, will now be described with reference to FIG. 11. The method 1100 may be implemented as one or more software code modules implementing the intra block copy module 350 which is resident in the hard disk drive 210 and is controlled in its execution by the processor 205.

The method 1100 supports both a 'full search' where all possible block vectors within a search range are tested and a 'fast search' where a subset of possible block vectors within a search range are tested. The fast search is typically used by the video encoder 114 due to the relatively high coding efficiency achieved compared against a large reduction in run-time compared to the full search.

At a set search range step 1102, the processor 205 assigns a search range for intra block copy. The search range defines a region within which reference blocks can be located. Thus, delta block vectors signal the difference from any predictor location (i.e. the sum of a current prediction unit (PU) location and the predictor) and the location of the desired reference block. When a local search is being performed, the search range is typically set to the current and previous coding tree unit (CTU), which typically results in dimensions of 128×64 luma samples. Note that within the search range, blocks that are yet to be reconstructed are present. Block vectors are prohibited from referencing samples from such blocks. When a full-frame search is being performed (i.e. the search range is set to the full frame, as opposed to an exhaustive test of all valid block vectors within the defined search range), the search range is set to the entire frame (e.g., frame 600), excluding coding tree unit (CTU) rows below the current coding tree unit (CTU) as such rows will have no reconstructed samples and thus no valid block vectors.

At a get block vector predictor step 1104, the processor 205 determines a predictor for the block vector. The predictor for the block vector is typically the block vector used for the last prediction unit (PU) to use intra block copy. The location of the reference block is relative to the current prediction unit (PU), so for a given predictor, the location of the referenced block will shift in accordance with the prediction unit (PU) locations, as determined by the Z-scan order within each coding tree block (CTB).

At a fast search test step 1106, control in the processor 205 passes to a test predictor SAD step 1110 if the fast search option is enabled in the video encoder 114, otherwise control in the processor 205 passes to a find best luma SAD step 1108.

At the find best luma SAD step 1108, an exhaustive search of all valid block vectors within the search range is performed. As such, a nested loop over X and Y components is performed. For each tested block vector the SAD is computed for the luma channel. The optimal block (i.e. lowest RD cost) is selected based on consideration of the luma SAD and the block vector coding cost in accordance with the lambda parameter. The method 1100 then terminates.

At the test predictor SAD step 1110, the block indicated by the block vector predictor from step 1104 is tested.

At the test vertical SADs step 1112, the intra block copy module 350, under control of the processor 205, tests a valid block vector indicating a reference block located above the prediction unit (PU), i.e. blocks within the region 610. The test executed at step 1112 considers the luma channel and the RD cost of coding the block vector. A candidate list of the best 'N' block vectors is maintained, with N typically being equal to four. The candidate list is updated such that the candidate list remains a sorted list.

At an early exit test 1113, the processor 205 tests to determine if the RD cost of the block falls below a threshold (e.g. five). If the RD cost of the block falls below the threshold at step 1113, then the method 1100 terminates without evaluating any further block vectors, and with the block vector providing the below threshold RD-cost being selected.

The steps 1112 and 1113 are performed for each valid block vector in the region 610.

At a test horizontal SAD test 1114, the intra block copy module 350, under control of the processor 205, tests a valid block vector indicating a reference block located to the left of the prediction unit (PU), i.e. blocks within the region 612. The test executed at step 1114 considers the luma channel and the RD cost of coding the block vector. Blocks are added to the candidate list if the RD-cost is an improvement on pre-existing candidates in the candidate list.

At an early exit test 1115, the processor 205 tests to determine if the RD cost of the block falls below a threshold (e.g. five). If the RD cost of the block falls below the threshold at step 1115, then the method 1100 terminates without evaluating any further block vectors, and with the block vector providing the below threshold RD cost being selected.

The steps 1114 and 1115 are performed for each valid block vector in the region 612.

At a chroma refinement step 1116, the intra block copy module 350, under control of the processor 205, performs a SAD for the luma and chroma components of each entry in the candidate list. Then, the best candidate is selected based on the combined luma/chroma SAD and the block vector coding cost.

At a 1D search flag test step 1118, the processor 205 tests to determine if the 1D search flag is enabled within the video encoder 114. If the 1D search flag is enabled at step 1118, then the method 1100 exits, with the block vector as determined in the chroma refinement step 1116 being selected. Otherwise, control in the processor 205 passes to a find best luma SADs step 1120.

At the find best luma SADs step 1120, the intra block copy module 350, under control of the processor 205, tests the luma SAD for block vectors such that only even Y components are tested. The test executed at step 1120 thus performs a 'sparse' version of the full search of the step 1106. A candidate list is maintained of the best (i.e. lowest) RD costs, with RD cost measured as luma SAD and block vector coding cost, adjusted according to the lambda parameter.

At the test luma SAD step 1122, the processor 205 compares the best (i.e. lowest) cost in the candidate list with a threshold and if the cost is below the threshold, control in the processor 205 is passed to a chroma refinement step 1124.

At the chroma refinement step 1124, the intra block copy module 350, under control of the processor 205, tests to determine the luma and chroma channels of each block vector in the candidate list. The block vector providing lowest RD cost in terms of block vector coding cost and joint luma/chroma SAD is selected. The method 1100 then terminates.

At the select best BV step 1132, the processor 205 compares the RD cost of each block vector in the candidate list with the RD cost of the best block vector determined in the 1D search of the steps 1112 to 1115. The optimal block vector (i.e., the block vector in the candidate list with the lowest RD cost) is selected for use and the method 1100 then terminates.

The steps 1102 to 1132 are repeated for each prediction unit (PU) in the coding unit (CU).

Figure 12:
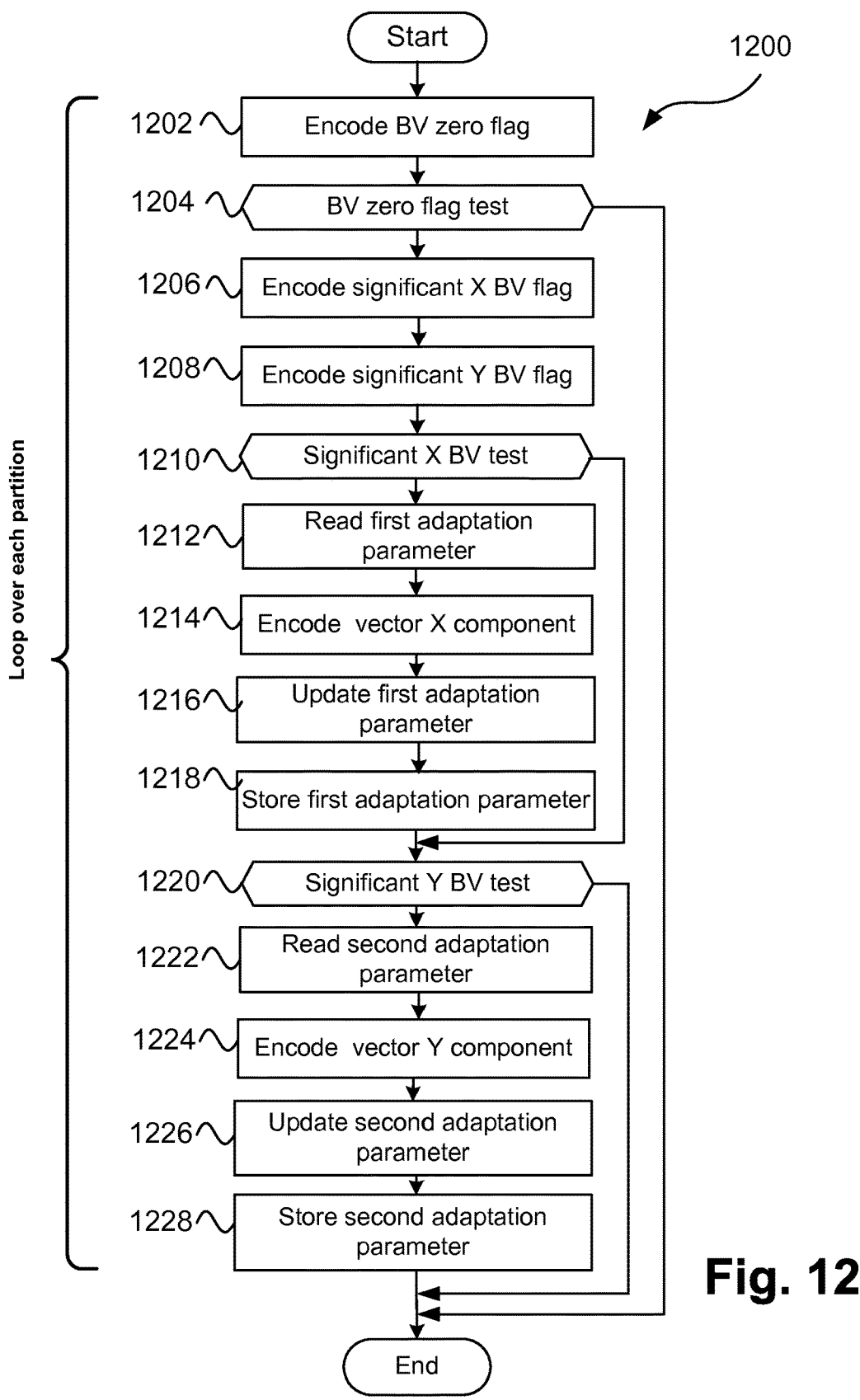
FIG. 12 is a schematic flow diagram showing a method of encoding the delta block vectors of a coding unit (CU) configured to use intra block copy mode into the encoded bitstream.

FIG. 12 shows a schematic flow diagram of a method 1200 for encoding the delta block vectors of a coding unit (CU) configured to use intra block copy mode into the encoded bitstream 312. The method 1200 provides an adaptive binarisation approach that adapts according to the magnitudes of the provided block vectors. The block vectors are as determined in the search block vectors step 1002 of FIG. 10. The deltas of the determined block vectors are stored in the encoded bitstream 312. The range of expected block vectors depends on the search range determined in the set search range step 1102 of FIG. 11. The adaptive capability of the method 1200 enables efficient coding of block vectors determined in the method 1100, with no further encoder decision to be made to select an optimal coding mode. In the method 1200, separate adaptation parameters are used for each component of the delta block vector (i.e. X and Y components), enabling adaptation to different statistics of each component.

The method 1200 may be implemented as one or more software code modules implementing the entropy encoder 324 which is resident in the hard disk drive 210 and is controlled in its execution by the processor 205. At an encode block vector zero flag step 1202, the entropy encoder 324, under control of the processor 205, encodes a flag (i.e. 943) into the encoded bitstream 312 signalling if both components of the delta block vector are zero. Again, the encoded bitstream 312 may be stored in the memory 206.

At a block vector zero flag test step 1204, the method 1100 terminates if the flag of step 1202 indicated that both vector components have values of zero. If the flag of step 1202 indicates that both vector components have values of zero, no further signalling is required in the encoded bitstream 312 to specify the delta block vector components. Otherwise, control in the processor 205 passes to an encode significant X block vector flag step 1206.

At the encode significant X block vector flag step 1206, the entropy encoder 324, under control of the processor 205, encodes a flag (i.e. 944) signalling if the X component of the delta block vector has a nonzero value. The flag (i.e. 944) is coded using a context coded bin. One context in the context memory 325 is dedicated to the coding of the flag (i.e. 944).

At an encode significant Y block vector flag step 1208, the entropy encoder 324, under control of the processor 205, encodes a flag (i.e. 946) signalling if the Y component of the delta block vector has a nonzero value. The flag (i.e. 946) is coded using a context coded bin. One context (i.e. separate or independent from the context associated with the step 1206) in the context memory 325 is dedicated to the coding of the flag (i.e. 946). In arrangements of the video encoder 114 where a block vector was selected in the method 1100 based on the 1D search, having separated contexts for each component of the block vector provides improved coding efficiency.

At a significant X block vector test step 1210, control in the processor 205 passes to a significant Y block vector test step 1220 if the X component of the block vector has a value of zero (i.e. the component is not significant). Otherwise, control in the processor 205 passes to a read first adaptation parameter 1212.

At the read first adaptation parameter 1212, the entropy encoder 324, under control of the processor 205, reads a first adaptation parameter from the context memory 325 which may be configured within the memory 206.

At an encode vector X component test step 1214, the entropy encoder 324, under control of the processing 205, encodes the magnitude of the X component (i.e. 948) of the delta block vector into the encoded bitstream 312 using the first adaptation parameter.

At an update first adaptation parameter step 1216, the entropy encoder 324, under control of the processor 205, updates the first adaptation parameter according to the value of the X component of the delta block vector.

At a store first adaptation parameter step 1218, the updated adaptation parameter as determined in the step 1216 is stored in the context memory 325.

At the significant Y block vector test step 1220, the method 1100 terminates if the magnitude of the Y component of the delta block vector is equal to zero. Otherwise, control in the processor 205 passes to a read second adaptation parameter step 1222.

At the read second adaptation parameter step 1222, the entropy encoder 324, under control of the processor 205, reads the second adaptation parameter from the context memory 325.

At an encode block vector Y component step 1224, the entropy encoder 324, under control of the processor 205, encodes the Y component (i.e. 950) of the delta block vector into the encoded bitstream using the second adaptation parameter from the step 1222.

At an update second adaptation parameter step 1226, the entropy encoder 324, under control of the processor 205, updates the second adaptation parameter according to the value of the Y component of the delta block vector.

At a store second adaptation parameter step 1228, the updated adaptation parameter as determined the step 1226 is stored in the context memory 325.

The entropy encoder 324, under control of the processor 205, also stores the sign of each component of the delta block vector (i.e. 952 and 954) into the encoded bitstream 312.

Figure 13:
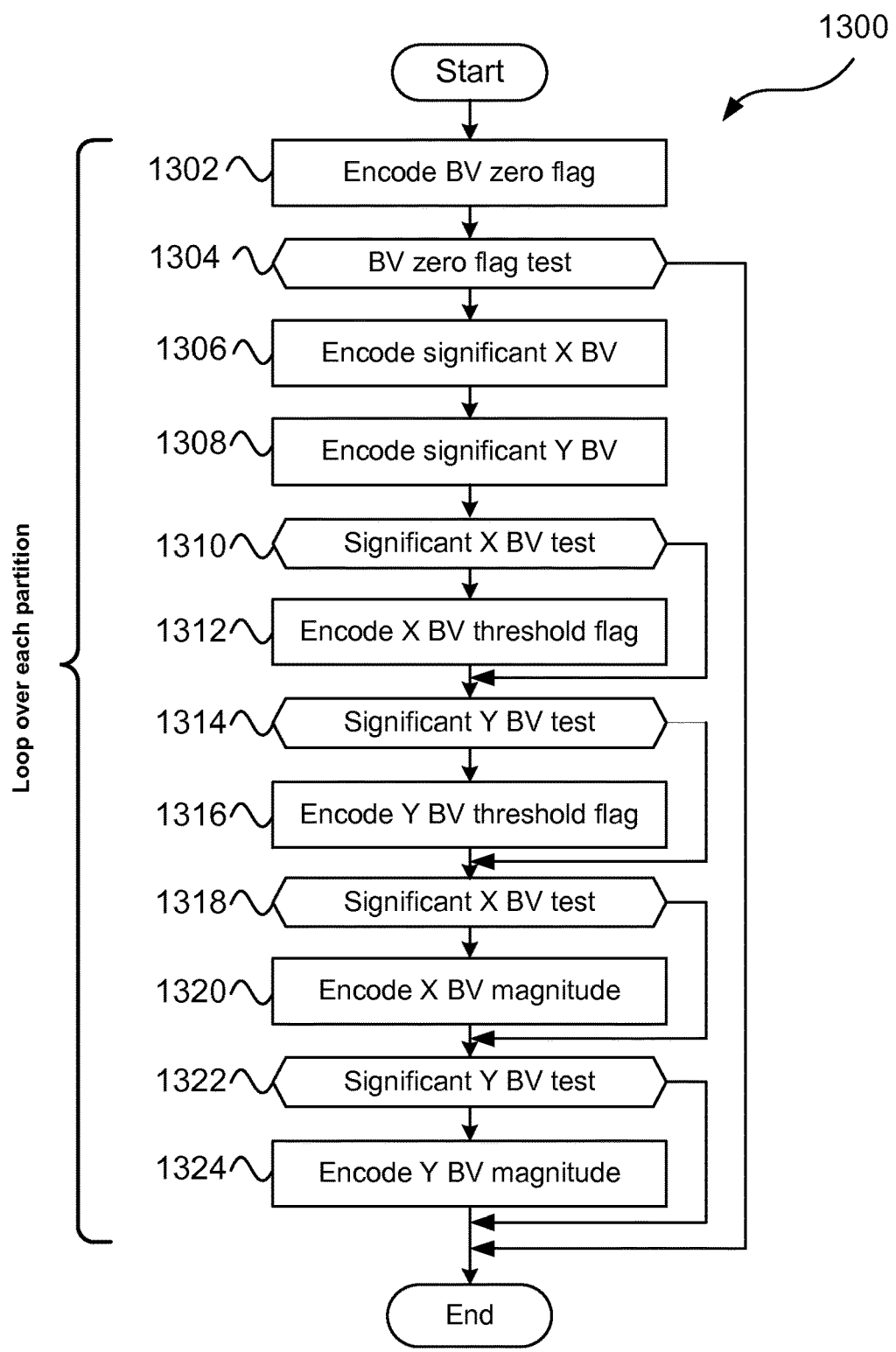
FIG. 13 is a schematic block diagram showing a method of encoding a delta block vector into the encoded bitstream.

The method 1100 then terminates. FIG. 13 shows a schematic block diagram of a method 1300 for encoding a delta block vector into the encoded bitstream 312.

The method 1300 may be implemented as one or more software code modules implementing the video encoder 114, which are resident in the hard disk drive 210 and are controlled in their execution by the processor 205. The method 1300 may be executed for each prediction unit (PU) in the coding unit (CU) configured for intra block copy.

At an encode block vector zero flag step 1302, the entropy encoder 324, under control of the processor 205, encodes a flag (i.e. 903) in the encoded bitstream 312 signalling if both components of the delta block vector are zero. Again, the encoded bitstream 312 may be stored in the memory 206.

At a block vector zero flag test step 1304, the method 1300 terminates if each component of the delta block vector has a value of zero. Otherwise, control in the processor 205 passes to an encode significant X block vector step 1306.

At the encode significant X block vector step 1306, the entropy encoder 324, under control of the processor 205, encodes a flag (i.e. 904) in the encoded bitstream 312. The flag signals if the X component of the delta vector is significant (i.e. nonzero) or not. The flag (i.e. 904) is coded using a context coded bin. One context in the context memory 325 is dedicated to the coding of the flag (i.e. 904).

At the encode significant Y block vector step 1308, the entropy encoder 324, under control of the processor 205, encodes a flag (i.e. 906) in the encoded bitstream 312. The flag encoded at step 1308 signals if the Y component of the delta vector is significant (i.e. nonzero) or not. The flag (i.e. 906) is coded using a context coded bin. One context (i.e. separate or independent from the context associated with the step 1306) in the context memory 325 is dedicated to the coding of the flag (i.e. 906). In arrangements of the video encoder 114 where a block vector was selected in the method 1100 based on the 1D search, having separated contexts for each component of the block vector provides improved coding efficiency.

At a significant X block vector test step 1310, control in the processor 205 passes to a significant Y block vector test step 1314 if the X component of the delta block vector is not significant. Otherwise, control passes to an encode X block vector threshold flag step 1312.

At the encode X block vector threshold flag step 1312, the entropy encoder 324, under control of the processor 205, encodes a flag (i.e. 908) into the bitstream using a context that signals which one of two parameter values is to be used to encode the magnitude of the X component of the delta block vector. The video encoder 114 determines the flag value by comparing the X component of the delta block vector with a constant value of two. If the value is two or less, the flag signals the use of value one as 'k', otherwise the flag signals the use of value four as 'k'.

At the significant Y block vector test step 1314, control in the processor 205 passes to a significant X block vector test step 1318 if the Y component of the delta block vector is not significant. Otherwise, control passes to an encode Y block vector threshold step 1316.

At the encode Y block vector threshold step 1316, the entropy encoder 324, under control of the processor 205, encodes a flag (i.e. 910) into the bitstream using a context that signals which one of two parameter values is to be used to encode the magnitude of the Y component of the delta block vector. The video encoder 114 determines the flag value by comparing the X component of the delta block vector with a constant value of two. If the value is two or less, the flag signals the use of value one as k, otherwise the flag signals the use of value four as k.

At the significant X block vector test step 1318, control in the processor 205 passes to a significant Y block vector test step 1322 if the X component of the delta block vector is not significant. Otherwise, control in the processor 205 passes to an encode X block vector magnitude step 1320.

At the encode X block vector magnitude step 1320, the entropy encoder 324, under control of the processor 205, encodes the magnitude of the X component (i.e. 912) of the delta block vector minus one into the encoded bitstream 312, using the parameter of the step 1312. For example, if an EGk binarisation method is used, the value k is dependent on the flag of the step 1312, and k is set to either one or four.

At the significant Y block vector test step 1322, the method 1300 terminates if the magnitude of the Y component of the delta block vector is not significant. Otherwise, control in the processor 205 passes to an encode Y block vector magnitude step 1324.

At the encode Y block vector magnitude step 1324, the entropy encoder 324, under control of the processor 205, encodes the magnitude of the Y component (i.e. 914) of the delta block vector minus one into the encoded bitstream 312, using the parameter of the step 1316.

The entropy encoder 324, under control of the processor 205, also encodes the sign of each component of the delta block vector (i.e. 916 and 918) into the encoded bitstream 312. The method 1300 then terminates.

Figure 14:
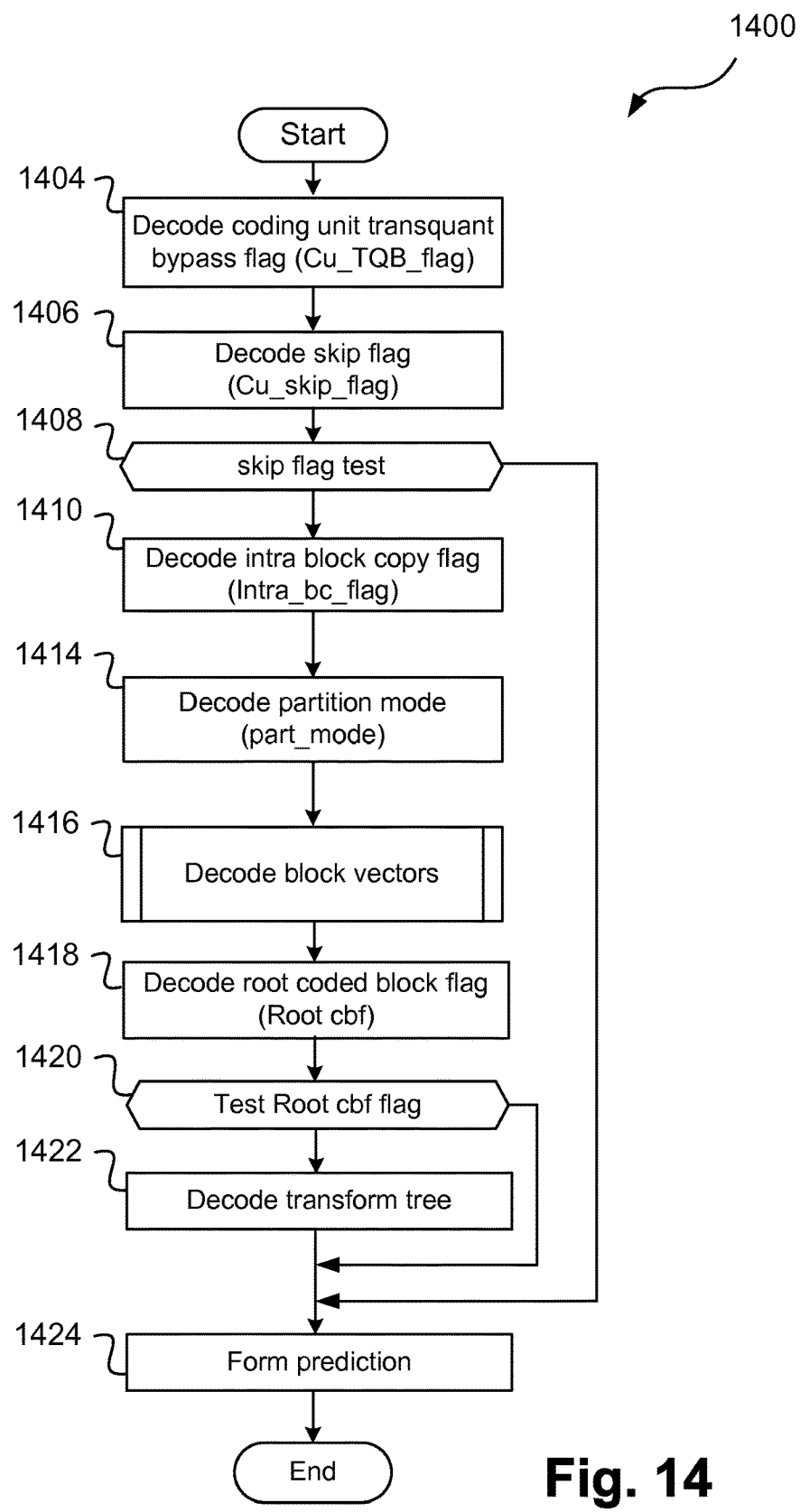
FIG. 14 is a schematic flow diagram showing a method of decoding a coding unit (CU) using intra block copy mode.

FIG. 14 is a schematic flow diagram showing a method 1400 for decoding a coding unit (CU) using intra block copy mode. The method 1400 may be implemented as one or more software code modules of the video decoder 134, which are resident in the hard disk drive 210 and are controlled in their execution by the processor 205.

At a decode coding unit transquant bypass flag step 1404, the entropy decoder module 420, under control of the processor 205, decodes the transquant bypass flag 804 from the encoded bitstream 312 and stores the decoded flag 804 in the memory 206.

At a decode skip flag step 1406, the entropy decoder 420, under control of the processor 205, decodes the skip flag 806 from the encoded bitstream 312 and stores the decoded flag 806 in the memory 206.

At a decode intra block copy flag step 1410, the entropy decoder 420, under control of the processor 205, decodes the intra block copy flag 808 from the encoded bitstream 312 and stores the decoded flag 808 in the memory 206.

At a decode partition mode step 1414, the entropy decoder 420, under control of the processor 205, decodes the partition mode 810 from the encoded bitstream 312 and stores the partition mode 810 in the memory 206.

At a decode block vectors step 1416, the entropy decoder 420, under control of the processor 205, decodes the delta block vectors 811 from the encoded bitstream 312. The decoded delta block vectors 811 are stored in the memory 206. A method 1500 of decoding delta block vectors of a coding unit (CU) configured to use intra block copy mode in the encoded bitstream 312, as executed at step 1416, will be described in detail below with reference to FIG. 15. A method 1600 of decoding a delta block vector from the encoded bitstream 312, as alternatively executed at step 1416, will be described in detail below with reference to FIG. 16.

At a decode root coded block flag step 1418, the entropy decoder 420, under control of the processor 205, decodes the root coded block flag 816 from the encoded bitstream 312 and stores the root coded block flag 816 in the memory 206.

At a decode transform tree step 1422, the entropy decoder 420, under control of the processor 205, decodes the transform tree 818 from the encoded bitstream 312. The step 1422 is only performed if the root coded block flag 816 of the step 1418 indicates the presence of significant residual coefficients for one or more transform units (TUs) within the residual quad-tree (RQT).

At a form prediction step 1424, the video decoder 134 reads (i.e. copies) a block of samples specified by the determined block vector. The determined block vector is determined by the vector addition of the current prediction unit (PU) location, the predicted block vector and the decoded delta block vector. The block of samples provides samples for the currently considered prediction unit (PU) of the coding unit (CU). The method 1400 then terminates.

Figure 15:
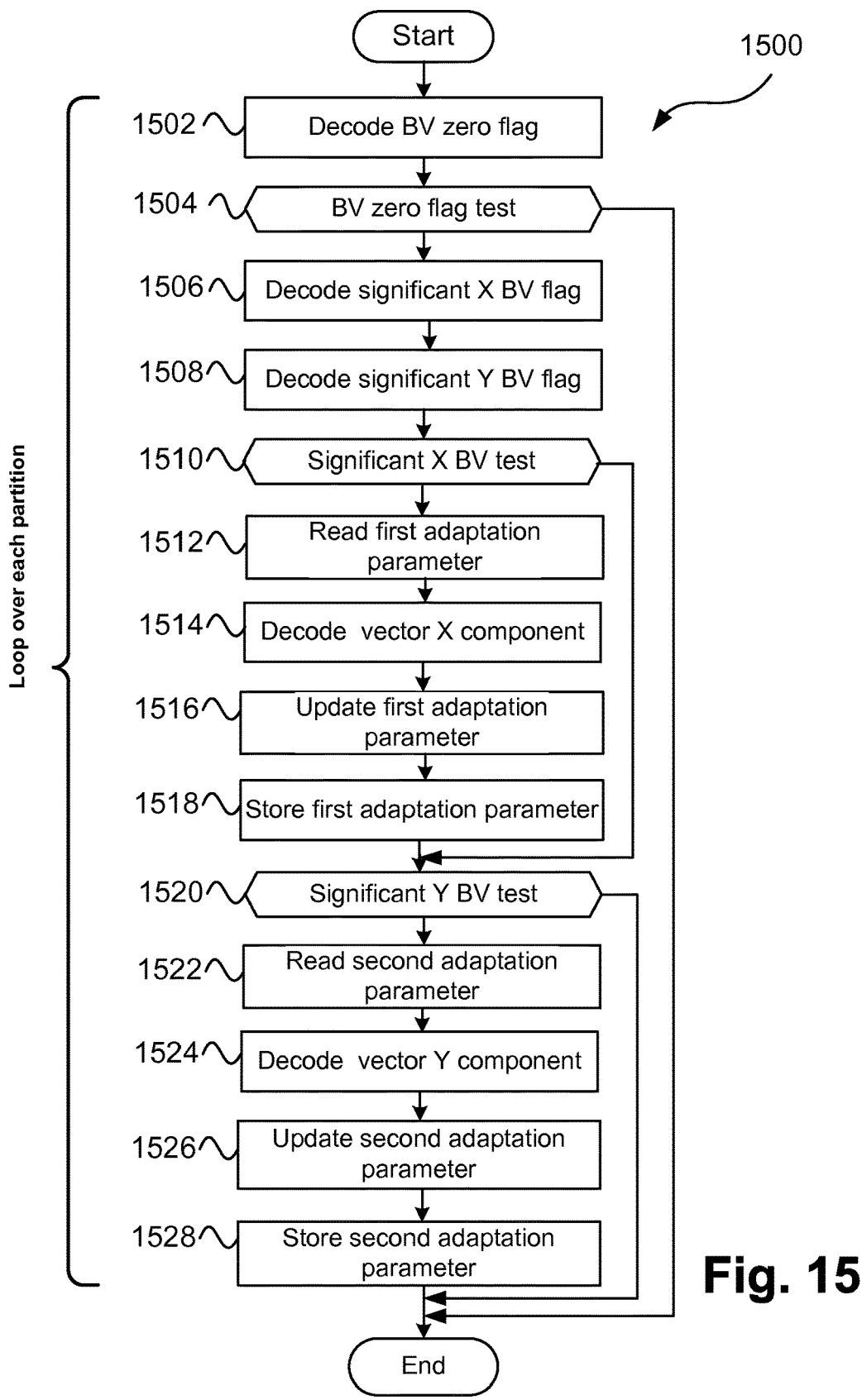
FIG. 15 is a schematic flow diagram showing a method of decoding delta block vectors of a coding unit (CU) configured to use intra block copy mode from an encoded bitstream.

FIG. 15 shows a schematic flow diagram of a method 1500 of decoding the delta block vectors of a coding unit (CU) configured to use intra block copy mode from the encoded bitstream 312. The method 1500 may be implemented as one or more software code modules of the video decoder 134, which are resident in the hard disk drive 210 and are controlled in their execution by the processor 205.

The method 1500 enables the video decoder 134 to parse the syntax structure 940 produced by the video encoder 114 performing the method 1200. The method 1500 is an adaptive binarisation method that adapts according to the magnitudes of the provided block vectors. The block vectors processed in accordance with the method 1500 are the block vectors determined in the search block vectors step 1002 of FIG. 10 in the video encoder 114, with the decoder reconstructing each of the block vectors based on a predicted block vector and decoded delta block vector. The deltas of the determined block vectors are read from the encoded bitstream 312. The range of expected block vectors depends on the search range determined in the set search range step 1102 of FIG. 11. Regardless of the search range actually used, the decoder supports block vectors indicating a reference block located anywhere within the frame (or the slice or tile as appropriate). The adaptive capability of the method 1500 enables decoding of block vectors determined in the method 1200. In the method 1200, separate adaptation parameters are used for each component of the delta block vector (i.e. X and Y components), enabling adaptation to different statistics of each component.

At a decode block vector zero flag step 1502, the entropy decoder 420, under control of the processor 205, decodes a flag (i.e. 943) from the encoded bitstream 312 signalling if both components of the delta block vector are zero. The flag 943 may be stored in the memory 206.

At a block vector zero flag test step 1504, the method 1500 terminates if the flag decoded at the step 1502 indicated that both vector components have values of zero. If the flag decoded at the step 1502 indicated that both vector components have values of zero, no further signalling is required in the encoded bitstream 312 for the video decoder 134 to determine the delta block vector components. Otherwise, control in the processor 205 passes to a decode significant X block vector flag step 1506.

At the decode significant X block vector flag step 1506, the entropy decoder 420, under control of the processor 205, decodes a flag (i.e. 944) signalling if the X component of the delta block vector has a nonzero value. The flag 944 may be stored in the memory 206. The flag (i.e. 944) is decoded using a context coded bin. One context in the context memory 419 is dedicated to the coding of the flag (i.e. 944).

At a decode significant Y block vector flag step 1508, the entropy decoder 420, under control of the processor 205, decodes a flag (i.e. 946) signalling if the Y component of the delta block vector has a nonzero value. The flag 946 may be stored in the memory 206. The flag (i.e. 946) is decoded using a context coded bin. One context (i.e. separate or independent from the context associated with the step 1506) in the context memory 419 is dedicated to the coding of the flag (i.e. 946). In arrangements of the video encoder 114 where a block vector was selected in the method 1100 based on the 1D search, having separated contexts for each component of the block vector provides improved coding efficiency. Separated contexts must also exist in the video decoder 134 in order to correctly parse the encoded bitstream 312 produced by the video encoder 114.

At a significant X block vector test step 1510, control in the processor 205 passes to a significant Y block vector test step 1520 if the X component of the block vector has a value of zero (i.e. the component is not significant). Otherwise, control in the processor 205 passes to a read first adaptation parameter 1512.

At the read first adaptation parameter 1512, the entropy decoder 420, under control of the processor 205, reads a first adaptation parameter from the context memory 419 and stores the first adaptation parameter in the memory 206.

At a decode vector X component test step 1514, the entropy decoder 420, under control of the processor 205, decodes the magnitude of the X component (i.e. 948) of the delta block vector from the encoded bitstream 312 using the first adaptation parameter. The magnitude of the X component (i.e. 948) may be stored in the memory 206.

At an update first adaptation parameter step 1516, the entropy decoder 420, under control of the processor 205, updates the first adaptation parameter according to the value of the X component of the delta block vector. Thus, the first adaptation parameter adapts only to the statistics of the X component of the delta block vector, and not the statistics of the Y component of the delta block vector.

At a store first adaptation parameter step 1518, the updated adaptation parameter as determined in the step 1216 is stored in the context memory 419 which may be configured within the memory 206.

At the significant Y block vector test step 1520, the method 1500 terminates if the magnitude of the Y component of the delta block vector is equal to zero. Otherwise, control in the processor 205 passes to a read second adaptation parameter step 1522.

At the read second adaptation parameter step 1522, the entropy decoder 420, under control of the processor 205, reads the second adaptation parameter from the context memory 419. The second adaptation parameter is a separate adaptation parameter to the first adaptation parameter. Thus, each dimension of the block vector is associated with an independent adaptation parameter.

At a decode block vector Y component step 1524, the entropy decoder 420, under control of the processor 205, decodes the Y component (i.e. 950) of the delta block vector from the encoded bitstream using the second adaptation parameter from the step 1522. The Y component 950 of the delta block vector may be stored in the memory 206.

At an update second adaptation parameter step 1526, the entropy decoder 420, under control of the processor 205, updates the second adaptation parameter according to the value of the Y component of the delta block vector. Thus, the second adaptation parameter adapts only to the statistics of the Y component of the delta block vector, and not the statistics of the X component of the delta block vector.

At a store second adaptation parameter step 1528, the updated adaptation parameter as determined the step 1526 is stored in the context memory 419.

The entropy decoder 420, under control of the processor 205, also decodes the sign of each component of the delta block vector (i.e. 952 and 954) from the encoded bitstream 312. The method 1500 then terminates.

Figure 16:
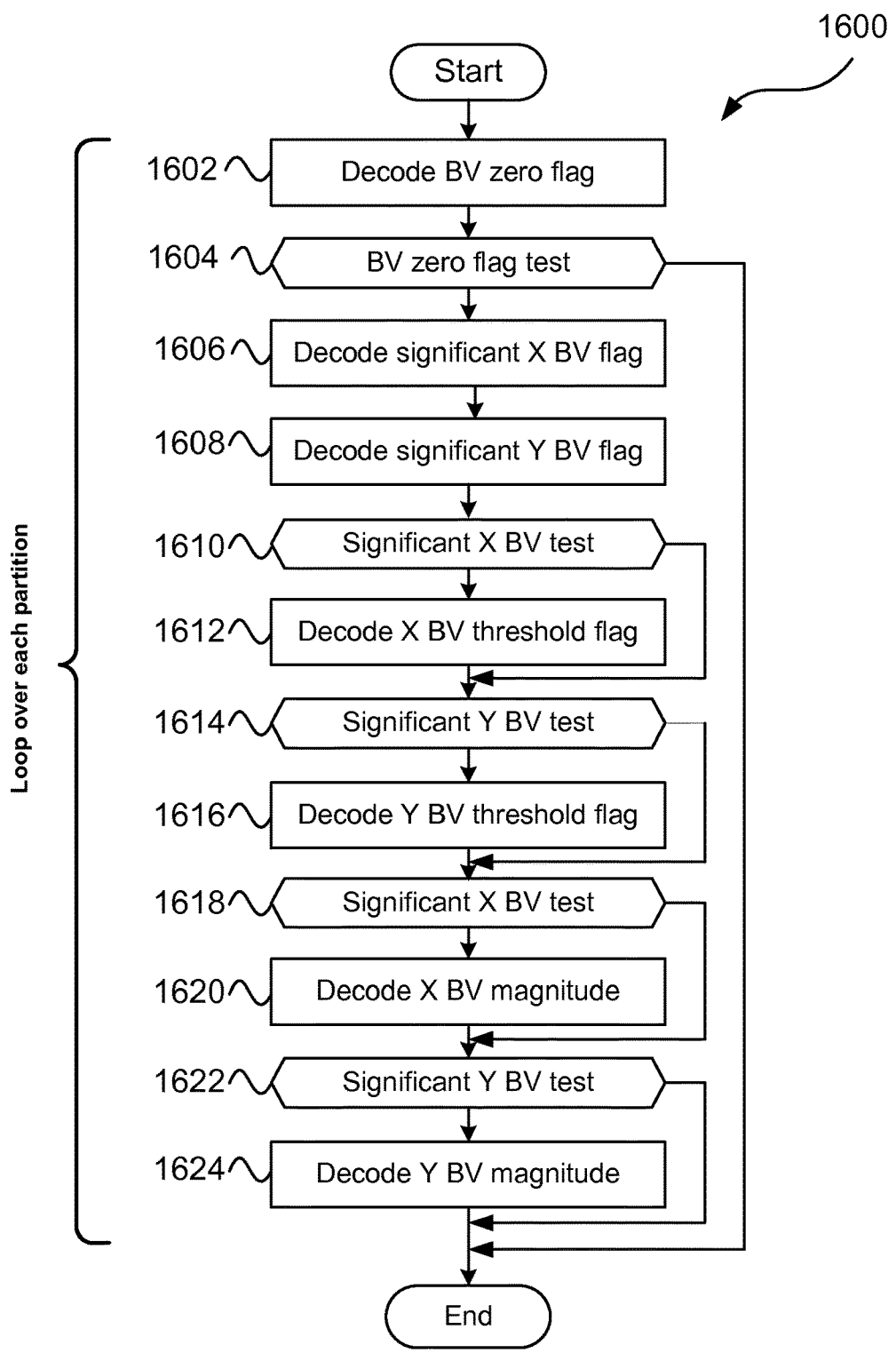
FIG. 16 is a schematic block diagram showing a method of decoding a delta block vector from an encoded bitstream.

FIG. 16 shows a schematic block diagram of a method 1600 of decoding a delta block vector from the encoded bitstream 312. The method 1600 may be implemented as one or more software code modules of the video decoder 134, which are resident in the hard disk drive 210 and are controlled in their execution by the processor 205.

The method 1600 is performed in the video decoder 134, under control of the processor 205, for each prediction unit (PU) in the coding unit (CU) configured for intra block copy. The method 1600 enables the video decoder 134 to parse the syntax structure 900 produced by the video encoder 114 performing the method 1300.

At a decode block vector zero flag step 1602, the entropy decoder 420, under control of the processor 205, decodes a flag (i.e. 903) from the encoded bitstream signalling if both components of the delta block vector are zero. The flag 903 may be stored in the memory 206.

At a block vector zero flag test step 1604, the method 1600 terminates if the flag of the step 1602 indicates that each component of the delta block vector has a value of zero. Otherwise, control in the processor 205 passes to a decode significant X block vector step 1606.

At the decode significant X block vector step 1606, the entropy decoder 420, under control of the processor 205, decodes a flag (i.e. 904) from the encoded bitstream 312. The flag signals if the X component of the delta vector is significant (i.e. nonzero) or not. The flag 904 may be stored in the memory 206. The flag (i.e. 904) is decoded using a context coded bin. One context in the context memory 419 is dedicated to the decoding of the flag (i.e. 904).

At the decode significant Y block vector step 1608, the entropy decoder 420, under control of the processor 205, decodes a flag (i.e. 906) from the encoded bitstream 312. The flag signals if the Y component of the delta vector is significant (i.e. nonzero) or not. The flag 906 may be stored in the memory 206. The flag (i.e. 906) is decoded using a context coded bin. One context (i.e. separate or independent from the context associated with the step 1606) in the context memory 419 is dedicated to the coding of the flag (i.e. 906). In arrangements of the video encoder 114 where a block vector was selected in the method 1100 based on the 1D search, having separated contexts for each component of the block vector provides improved coding efficiency. Separated contexts must also exist in the video decoder 134 in order to correctly parse the encoded bitstream 312 produced by the video encoder 114.

At a significant X block vector test step 1610, control in the processor 205 passes to a significant Y block vector test step 1614 if the X component of the delta block vector is not significant. Otherwise, control passes to a decode X block vector threshold flag step 1612.

At the decode X block vector threshold flag step 1612, the entropy decoder 420, under control of the processor 205, decodes a flag (i.e. 908) from the bitstream using a context that signals which one of two parameter values is to be used to decode the magnitude of the X component of the delta block vector. The flag 908 may be stored in the memory 206.

At the significant Y block vector test step 1614, control in the processor 205 passes to a significant X block vector test step 1618 if the Y component of the delta block vector is not significant. Otherwise, control passes to a decode Y block vector threshold step 1616.

At the decode Y block vector threshold step 1616, the entropy decoder 420, under control of the processor 205, decodes a flag (i.e. 910) from the bitstream using a context that signals which one of two parameter values is to be used to decode the magnitude of the Y component of the delta block vector. The flag 910 may be stored in the memory 206.

At the significant X block vector test step 1618, control in the processor 205 passes to a significant Y block vector test step 1322 if the X component of the delta block vector is not significant. Otherwise, control in the processor 205 passes to a decode X block vector magnitude step 1620.

At the decode X block vector magnitude step 1620, the entropy decoder 420, under control of the processor 205, decodes the magnitude of the X component (i.e. 912) of the delta block vector minus one from the encoded bitstream 312, using the parameter of the step 1612. For example, if an EGk binarisation method is used, the value k is dependent on the flag of the step 1612, and the value k may be either one or four.

At the significant Y block vector test step 1622, the method 1600 terminates if the magnitude of the Y component of the delta block vector is not significant (i.e. is equal to zero). Otherwise, control in the processor 205 passes to a decode Y block vector magnitude step 1624.

At the decode Y block vector magnitude step 1624, the entropy decoder 420, under control of the processor 205, decodes the magnitude of the Y component (i.e. 914) of the delta block vector minus one from the encoded bitstream 312, using the parameter of the step 1616. The magnitude of the Y component 914 of the delta block vector may be stored in the memory 206.

The entropy decoder 420, under control of the processor 205, also decodes the sign of each component of the delta block vector (i.e. 916 and 918) from the encoded bitstream 312. The method 1600 then terminates.

In one arrangement of the video encoder 114 and the video decoder 134, the encoding method used in the steps 1214, 1224, 1514 and 1524 is a 'residual coefficient coding' (or 'coeff_abs_level_remaining') method, as described with reference to FIGS. 7A and 7B, as used for significant residual coefficients, and the adaptation parameter is used to determine the 'Rice parameter', e.g. by division by a value that is preferably a power of two, enabling the division to be implemented using a right-shift operation. For the residual coding, the value used is four. The increase in complexity of such an arrangement is minimal, as the 'coeff_abs_level_remaining' binarisation method is reused. In such arrangements, the steps 1216 and 1226 update the Rice parameter for each component according to Equation (1), as follows:

if (uiLevel>=3*(1<<(statCoeff/4))) statCoeff++;

else if ((2*uiLevel)<(1<<(statCoeff/4))) statCoeff--;

Where uiLevel is the component magnitude minus one as the presence of the significant X or Y block vector flag, e.g. 944 or 946 already signals that zero valued component magnitudes are not coded using the steps 1214, 1224, 1512 or 1524 and statCoeff is an adaptation parameter. After updating, each updated Rice parameter is stored in the local memory store, i.e. the context memory 325 in the video encoder 114 and the context memory 419 in the video decoder 419. Then, the reference block is copied from a reconstructed sample buffer (generally configured within the memory 206) using a determined block vector to specify the location of the reference block relative to the location of the current prediction unit (PU) and the predictor block vector.

One method of determining the Rice parameter value for the 'coeff_abs_level_remaining' method is to divide the adaptation parameter by two. Dividing the adaptation parameter by two gives increased coding efficiency compared to performing a division by four.

In another arrangement of the video encoder 114 and the video decoder 134, the encoding method used in the steps 1214, 1224, and the decoding method used in the steps 1514 and 1524 is a kth order exponential golomb coding method and the adaptation parameter is the value 'k'. The incremental complexity of such an arrangement is minimal as the kth order exponential binarisation process is already present in the video encoder 114 and the video decoder 134.

In one arrangement of the video encoder 114 and the video decoder 134, a separate adaptation parameter is used for each component of the delta block vector (i.e. a first adaptation parameter for the X component and a second adaptation parameter for the Y component). The adaptation parameters are read from the local memory store, i.e. the context memory 325 in the video encoder 114 and the context memory 419 in the video decoder 419. An arrangement using a separate adaptation parameter for each component of the delta block vector as described provides independent adaptation for each component in the multi-dimensional delta block vector, which is beneficial when the statistics of the selected block vectors have large differences between each component.

In an alternative arrangement of the video encoder 114 and the video decoder 134, a single adaptation parameter is used for both the X component and the Y component of the delta block vector. An arrangement which uses a single adaptation parameter is used for both the X component and the Y component of the delta block vector provides a simple adaptive scheme, with one additional adaptation parameter being shared among both components.

In yet another arrangement of the video encoder 114 and the video decoder 134, the selection of the adaptation parameter is dependent on the size of the prediction unit (PU). In arrangements where the selection of the adaptation parameter is dependent on the size of the prediction unit (PU), separate adjustment parameters are available for prediction units (PUs) belonging to coding units (CUs) of sizes 64×64, 32×32, 16×16 and 8×8 prediction units (PUs). Moreover, one set of separate adaptation parameters may be used for prediction units (PUs) belonging to a coding unit (CU) with a partition mode of 2N×2N; and a separate set of adaptation parameters may be used for prediction for prediction units (PUs) belonging to a coding unit (CU) with a partition mode other than 2N×2N (i.e. N×N, 2N×N or N×2N and if 'asymmetric motion partitions' are supported then also 2NxnU, 2NxnD, nLx2N and nRx2N). An arrangement where the selection of the adaptation parameter is dependent on the size of the prediction unit (PU) provides a high level of adaptation to different search strategies being used for different block sizes, at the cost of increased storage requirements for the larger number of adaptation parameters being held.

In yet another arrangement of the video encoder 114 and the video decoder 134, the encoding method used in the steps 1214, 1224, and the decoding method used in the steps 1514 and 1524 is a kth order exponential golomb coding method with the value 'k' fixed to a particular value. As the value is fixed, such arrangements do not have any adaptation parameters. A value of four for the fixed value k provides gains in both the full search region case and the local search region case. However, the gains achieved for a value of four for the fixed value k are less than the gains achieved by arrangements that make use of adaptation parameters.

In another arrangement, the 'coeff_abs_level_remaining' binarisation method is used for the encoding method in the steps 1214, 1224, and the decoding method in the steps 1514 and 1524, where the Rice parameter is fixed to a particular value. A value of three for the fixed Rice parameter provides coding efficiency gains in both the local search region case and the full search region case. However, the coding efficiency gains achieved where a value of three was used for the fixed Rice parameter were less than the gains achieved by arrangements that have adaptation parameters.

In yet another arrangement of the video encoder 114 and the video decoder 134, the steps 1312 and 1316 select between using a fixed length codeword (FLC) or a kth order Exponential Golomb binarisation method. A fixed length codeword is limited to encoding a finite number of values and so the threshold applied in the steps 1312 and 1316 to select between applying each binarisation method is determined by the size of the fixed length codeword. The length of the fixed length codeword is fixed at a particular value, e.g. one. Then, the number of magnitude values that can be represented using the fixed length codeword is equal to two to the power of the length of the fixed length codeword in bits, i.e. two, when the fixed length codeword has a length of one bit. Once the coding space (i.e. two discrete values of a component magnitude) is exhausted, the kth order Exponential Golomb binarisation method is used to code remaining magnitude values of the component of the delta block vector, e.g. with the value 'k' equal to four.

FIG. 17 is a table 1700 showing codewords for binarisation of delta block vector component magnitudes using a fixed length codeword or a kth order Exponential Golomb codeword. The table 1700 shows the significant flag values, the threshold flag values and the remaining magnitude values for several component magnitude values. When the threshold flag is equal to zero, the remaining magnitude is encoded in the steps 1320 and 1324 or FIG. 13 and decoded in the steps 1620 and 1624 using a one-bit fixed length codeword, otherwise a kth order Exponential Golomb binarisation method is used, with the value k equal to four.

The threshold is determined as the sum of one plus two of the power of the fixed length codeword length. When the fixed length codeword length is one, the threshold used for the steps 1312 and 1316 of FIG. 13 is three.

In one arrangement of the method 1300 of FIG. 13 and 1600 of FIG. 16, using a fixed length codeword, each bin of the fixed length codeword is coded using a context coded bin instead of a bypass coded bin. In the arrangement of the methods 1300 and 1600 where each bin of the fixed length codeword is coded using a context coded bin instead of a bypass coded bin, non-uniformity in the probability distribution of usage of each fixed length codeword value can be exploited to increase coding efficiency.

Specific implementations of the arrangements described herein are expressed in Appendix 1 and Appendix 2 which show syntax tables according to the HEVC standard, where the syntax tables have been modified and varied according to the specific intra block copy prediction delta block vector coding processes for encoding and decoding described herein.

The methods of encoding block vectors described above are highly desirable as the methods improve the compression efficiency achievable by intra block copy making intra block copy a more competitive candidate mode for selection by a video encoder. The described methods thus improve the achievable compression efficiency.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX 1

| 7.3.8.5 Coding unit syntax | |
| --- | --- |
| coding_unit( x0, y0, log2CbSize ) { | Descriptor |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | |
|       intra_bc_flag[ x0 ][ y0 ] | ae(v) |
|     if( slice_type != I && !intra_bc_flag[ x0 ][ y0 ] ) | |
|       pred_mode_flag | ae(v) |
|     if( CuPredMode[ x0 ][ y0 ] != MODE_INTRA \| \| intra_bc_flag[ x0 ][ y0 ] | |
| \| \| | |
|       log2CbSize = = MinCbLog2SizeY ) | |
|       part_mode | ae(v) |
|     if( CuPredMode[ x0 ][ y0 ] = = MODE_INTRA ) { | |
|       if( PartMode = = PART_2Nx2N && pcm_enabled_flag && | |
|         !intra_bc_flag[ x0 ][ y0 ] && | |
|         log2CbSize >= Log2MinIpcmCbSizeY && | |
|         log2CbSize <= Log2MaxIpcmCbSizeY ) | |
|         pcm_flag[ x0 ][ y0 ] | ae(v) |

APPENDIX 1-continued

7.3.8.5 Coding unit syntax

```
        if( pcm_flag[ x0 ][ y0 ] ) {
            while( !byte_aligned( ) )
                pcm_alignment_zero_bit                              f(1)
            pcm_sample( x0, y0, log2CbSize )
        } else if( intra_bc_flag[ x0 ][ y0 ] ) {
            bvd_coding( x0, y0, 2)
            if( PartMode = = PART_2NxN )
                bvd_coding( x0, y0 + ( nCbS / 2 ), 2)
            else if( PartMode = = PART_Nx2N )
                bvd_coding( x0 + ( nCbS / 2 ), y0, 2)
            else if( PartMode = = PART_NxN ) {
                bvd_coding( x0 + ( nCbS / 2 ), y0, 2)
                bvd_coding( x0, y0 + ( nCbS / 2 ), 2)
                bvd_coding( x0 + ( nCbS / 2 ), y0 + ( nCbS / 2 ), 2)
........
        } else {
        }
    }
}
```

| bvd_coding( x0, y0, refList ) { | Descriptor |
|---|---|
| abs_bvd_greater0_flag[ x0 ][ y0 ][ 0 ] | ae(v) |
| abs_bvd_greater0_flag[ x0 ][ y0 ][ 1 ] | ae(v) |
| if( abs_bvd_greater0_flag[ x0 ][ y0 ][ 0 ] ) | |
|    abs_bvd_k_flag[ x0 ][ y0 ][ 0 ] | ae(v) |
| if( abs_bvd_greater0_flag[ x0 ][ y0 ][ 1 ] ) | |
|    abs_bvd_k_flag[ x0 ][ y0 ][ 1 ] | ae(v) |
| if( abs_bvd_greater0_flag[ x0 ][ y0 ][ 0 ] ) { | |
|    if( abs_bvd_greater1_flag[ x0 ][ y0 ][ 0 ] ) | |
|      abs_bvd_minus2[ x0 ][ y0 ][ 0 ] | ae(v) |
|    bvd_sign_flag[ x0 ][ y0 ][ 0 ] | ae(v) |
| } | |
| if( abs_bvd_greater0_flag[ x0 ][ y0 ][ 1 ] ) { | |
|    if( abs_mvd_greater1_flag[ x0 ][ y0 ][ 1 ] ) | |
|      abs_bvd_minus2[ x0 ][ y0 ][ 1 ] | ae(v) |
|    bvd_sign_flag[ x0 ][ y0 ][ 1 ] | ae(v) |
| } | |
| } | |

TABLE 9-34

Syntax elements and associated binarizations

| Syntax structure | Syntax element | Binarization Process | Input parameters |
|---|---|---|---|
| bvd_coding( ) | abs_bvd_greater0_flag[ ] | FL | cMax = 1 |
| | abs_bvd_k_flag[ ] | FL | cMax = 1 |
| | abs_bvd_minus2[ ] | 9.3.3.10 | — |
| | bvd_sign_flag[ ] | FL | cMax = 1 |

9.3.3.10 Binarization Process for abs_bvd_minus2[ ]

Input to this process is a request for a binarization for the syntax element abs_mvd_minus2 [n], where n is the component index of the delta block vector, with x=0 indicating the horizontal component and x=1 indicating the vertical component.

Output of this process is the binarization of the syntax element.

The variable initRiceValue is derived as follows:
  The variable sbType is assigned the value n.
  The variable initRiceValue is derived as follows:

initRiceValue=StatCoeffBvd[sbType]/4

StatCoeffBvd[sbType] is modified as follows:

if(bvd_minus2[$n$]>=(3<<(StatCoeffBvd[sbType]/4)))
    StatCoeffBvd[sbType]++ else if(2*bvd_minus2[$n$]<(1<<(StatCoeffBvd[sbType]/4))) if(StatCoeffBvd[sbType]>0) StatCoeffBvd[sbType]−−

The variable cMax is derived from cRiceParam as:

$c$Max=4<<$c$RiceParam

The binarization of the syntax element bvd_minus2 [n] is a concatenation of a prefix bin string and (when present) a suffix bin string.

For the derivation of the prefix bin string, the following applies:

The prefix value of bvd_minus2, prefixVal, is derived as follows:

prefixVal=Min($c$Max, bvd_minus2[$n$])    (9-15)

The prefix bin string is specified by invoking the TR binarization process as specified in subclause 9.3.3.2 for prefixVal with the variables cMax and cRiceParam as inputs.

When the prefix bin string is equal to the bit string of length 4 with all bits equal to 1, the suffix bin string is present and it is derived as follows:

The suffix value of cu_qp_delta_abs, suffixVal, is derived as follows:

suffixVal=bvd_minus2[$n$]−$c$Max    (9-16)

The suffix bin string is specified by invoking the EGk binarization process as specified in subclause 9.3.3.3 for suffixVal with the Exp-Golomb order k set equal to cRiceParam+1.

APPENDIX 2

7.3.8.5 Coding unit syntax

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | |
|       intra_bc_flag[ x0 ][ y0 ] | ae(v) |
|     if( slice_type != I && !intra_bc_flag[ x0 ][ y0 ] ) | |
|       pred_mode_flag | ae(v) |
|     if( CuPredMode[ x0 ][ y0 ] != MODE_INTRA \|\| intra_bc_flag[ x0 ][ y0 ] \|\| | |
|       log2CbSize = = MinCbLog2SizeY ) | |
|       part_mode | ae(v) |
|     if( CuPredMode[ x0 ][ y0 ] = = MODE_INTRA ) { | |
|       if( PartMode = = PART_2Nx2N && pcm_enabled_flag && | |
|         !intra_bc_flag[ x0 ][ y0 ] && | |
|         log2CbSize >= Log2MinIpcmCbSizeY && | |
|         log2CbSize <= Log2MaxIpcmCbSizeY ) | |
|         pcm_flag[ x0 ][ y0 ] | ae(v) |
|       if( pcm_flag[ x0 ][ y0 ] ) { | |
|         while( !byte_aligned( ) ) | |
|           pcm_alignment_zero_bit | f(1) |
|         pcm_sample( x0, y0, log2CbSize ) | |
|       } else if( intra_bc_flag[ x0 ][ y0 ] ) { | |
|         bvd_coding( x0, y0, 2) | |
|         if( PartMode = = PART_2NxN ) | |
|           bvd_coding( x0, y0 + ( nCbS / 2 ), 2) | |
|         else if( PartMode = = PART_Nx2N ) | |
|           bvd_coding( x0 + ( nCbS / 2 ), y0, 2) | |
|         else if( PartMode = = PART_NxN ) { | |
|           bvd_coding( x0 + ( nCbS / 2 ), y0, 2) | |
|           bvd_coding( x0, y0 + ( nCbS / 2 ), 2) | |
|           bvd_coding( x0 + ( nCbS / 2 ), y0 + ( nCbS / 2 ), 2) | |
| ........ | |
|     } else { | |
|     } | |
|   } | |
| } | |

| bvd_coding( x0, y0, refList ) { | Descriptor |
|---|---|
|   abs_bvd_greater0_flag[ x0 ][ y0 ][ 0 ] | ae(v) |
|   abs_bvd_greater0_flag[ x0 ][ y0 ][ 1 ] | ae(v) |
|   if( abs_bvd_greater0_flag[ x0 ][ y0 ][ 0 ] ) | |
|     abs_bvd_k_flag[ x0 ][ y0 ][ 0 ] | ae(v) |
|   if( abs_bvd_greater0_flag[ x0 ][ y0 ][ 1 ] ) | |
|     abs_bvd_k_flag[ x0 ][ y0 ][ 1 ] | ae(v) |
|   if( abs_bvd_greater0_flag[ x0 ][ y0 ][ 0 ] ) { | |
|     if( abs_bvd_greater1_flag[ x0 ][ y0 ][ 0 ] ) | |
|       abs_bvd_minus2[ x0 ][ y0 ][ 0 ] | ae(v) |
|     bvd_sign_flag[ x0 ][ y0 ][ 0 ] | ae(v) |
|   } | |
|   if( abs_bvd_greater0_flag[ x0 ][ y0 ][ 1 ] ) { | |
|     if( abs_mvd_greater1_flag[ x0 ][ y0 ][ 1 ] ) | |
|       abs_bvd_minus2[ x0 ][ y0 ][ 1 ] | ae(v) |
|     bvd_sign_flag[ x0 ][ y0 ][ 1 ] | ae(v) |
|   } | |
| } | |

TABLE 9-34

Syntax elements and associated binarizations

| | | Binarization | |
|---|---|---|---|
| Syntax structure | Syntax element | Process | Input parameters |
| bvd_coding( ) | abs_bvd_greater0_flag[ ] | FL | cMax = 1 |
| | abs_bvd_k_flag[ ] | FL | cMax = 1 |

TABLE 9-34-continued

Syntax elements and associated binarizations

| Syntax structure | Syntax element | Binarization | |
| --- | --- | --- | --- |
| | | Process | Input parameters |
| | abs_bvd_minus2[ ] | EG1 when abs_bvd_k_flag[ ] = 0, and EG4 when abs_bvd_k_flag[ ] = 1. | — |
| | bvd_sign_flag[ ] | FL | cMax = 1 |

Sub-clause 9.3.3.3 defines the kth order Exponential Golomb process (EGk). In Table 9-34 above, 'EG1' means invoking this process with k=1 and 'EG4' means k=4 when invoking this process.

The invention claimed is:

1. A method of decoding a block of samples of an image frame from a video bitstream, the method comprising:
accessing a plurality of components of a vector in the video bitstream, the plurality of components indicating a spatial location in the image frame of a block of reference samples that corresponds to the block samples;
reading a plurality of adaptation parameters corresponding to the plurality of components of the vector from a local memory, the adaptation parameters being determined based on a size of a coding unit containing the block of samples, the size of the coding unit being specified in luma samples;
decoding each of the plurality of components of the vector from the video bitstream using a corresponding adaptation parameter from the plurality of adaptation parameters, wherein each said adaptation parameter is updated, for use in decoding further vectors from the video bitstream, using the corresponding decoded component so that each said adaptation parameter is adapted to statistics of the corresponding component that are derived from a single sequence of image frames including the image frame, and wherein each adaptation parameter is updated independently of other adaptation parameters of the plurality of adaptation parameters;
copying the block of reference samples from the video bitstream using the plurality of decoded components of the vector and decoded components from the decoded further vectors; and
decoding the block of samples using the copied block of reference samples.

2. The method according to claim 1, wherein the adaptation parameter is a Rice parameter.

3. The method according to claim 1, wherein the adaptation is a value 'k' for kth order exponential-golomb coding process.

4. A system for decoding a block of samples of an image frame from a video bitstream, the system comprising:
a memory having data and a computer program stored thereon;
a processor coupled to the memory for executing the computer program, the computer program having instructions for:
accessing a plurality of components of a vector in the video bitstream, the plurality of components indicating a spatial location in the image frame of a block of reference samples that corresponds to the block samples;
reading a plurality of adaptation parameters corresponding to the plurality of components of the vector from a local memory store, the adaptation parameters being determined based on a size of a coding unit containing the block of samples, the size of the coding unit being specified in luma samples;
decoding each of the plurality of components of the vector from the video bitstream using a corresponding adaptation parameter from the plurality of adaptation parameters, wherein each said adaptation parameter is updated, for use in decoding further vectors from the video bitstream, using the corresponding decoded component so that each said adaptation parameter is adapted to statistics of the corresponding component that are derived from a single sequence of image frames including the image frame, and wherein each adaptation parameter is updated independently of other adaptation parameters of the plurality of adaptation parameters;
copying the block of reference samples from the video bitstream using the plurality of decoded components of the vector and decoded components from the decoded further vectors; and
decoding the block of samples using the copied block of reference samples.

5. An apparatus for decoding a block of samples of an image frame from a video bitstream, the apparatus comprising:
an accessing module for accessing a plurality of components of a vector in the video bitstream, the plurality of components indicating a spatial location in the image frame of a block of reference samples that corresponds to the block of samples;
a reading module for reading a plurality of adaptation parameters corresponding to the plurality of components of the vector from a local memory store, the adaptation parameters being determined based on a size of a coding unit containing the block of samples, the size of the coding unit being specified in luma samples;
a decoding module for decoding each of the plurality of components of the vector from the video bitstream using a corresponding adaptation parameter from the plurality of adaptation parameters, wherein each said adaptation parameter is updated, for use in decoding further vectors from the video bitstream, using the corresponding decoded component so that each said adaptation parameter is adapted to statistics of the corresponding component that are derived from a single sequence of image frames including the image frame, and wherein each adaptation parameter is updated independent of other adaptation parameters of the plurality of adaptation parameters; wherein
a copying module for copying the block of reference samples from the video bitstream using the plurality of decoded components of the vector and decoded components from the decoded further vectors; and a decoding module for decoding the block of samples using the copied block of reference samples.

6. A non-transitory computer readable medium having a computer program stored on the medium for decoding a block of samples of an image frame from a video bitstream, the program comprising:

code for accessing a plurality of components of a vector in the video bitstream, the plurality of components indicating a spatial location in the image frame of a block of reference samples that corresponds to the block of samples;

code to read a plurality of adaptation parameters corresponding to the plurality of components of the vector from a local memory store, the adaptation parameters being determined based on a size of a coding unit containing the block of samples, the size of the coding unit being specified in a luma sample;

code for decoding each of the plurality of components of the vector from the video bitstream using a corresponding adaptation parameter from the plurality of adaptation parameters, wherein each said adaptation parameter is updated, for use in decoding further vectors from the video bitstream, using the corresponding decoded component so that each said adaptation parameter is adapted to statistics of the corresponding component that are derived from a single sequence of image frames including the image frame, and wherein each adaptation parameter is updated independently of other adaptation parameters of the plurality of adaptation parameters;

code for copying the block of reference samples from the video bitstream using the plurality of decoded of components of the vector and decoded components from the decoded further vectors, and code for decoding the block of samples using the copied block of reference samples.

7. A method of decoding a block of samples of an image frame from a video bitstream, the method comprising:

accessing a plurality of components of a vector in the video bitstream, the plurality of components indicating a spatial location in the image frame of a block of reference samples that corresponds to the block of samples;

reading a plurality of adaptation parameters corresponding to the plurality of components of the vector from a local memory store, the adaptation parameters being determined based on a size of a coding unit containing the block of samples, the size of the coding unit being specified in luma samples;

decoding each of the plurality of components of the vector from the video bitstream using a corresponding adaptation parameter from the plurality of adaptation parameters, wherein copying the block of reference samples from the video bitstream using the plurality of decoded components of the vector, wherein one or more of said adaptation parameters are updated using the corresponding decoded component for use in decoding further vectors from the video bitstream so that each said adaptation parameter is adapted to statistics of the corresponding component that are derived from a single sequence of image frames including the image frame; and decoding the block of samples using the copied block of reference samples.

8. A method of decoding a block of samples of an image frame from a video bitstream, the method comprising:

accessing a plurality of components of a vector in the video bitstream, the plurality of components indicating a spatial location in the image frame of a block of reference samples that corresponds to the block of samples;

reading a plurality of adaptation parameters from a local memory store, each adaptation parameter having independent values, the adaptation parameters being determined based on a size of a coding unit containing the block of samples, the size of the coding unit being specified in luma samples;

decoding each of the plurality of components of the vector from the video bitstream using a corresponding adaptation parameter from the plurality of adaptation parameters, wherein each said adaptation parameter is updated for use in decoding further vector from the video bitstream, using the corresponding decoded component so that each said adaptation parameter is adapted to statistics of the corresponding component that are derived from a single sequence of image frames including the image frame;

copying the block of reference samples from the video bitstream using the plurality of decoded components of the vector and decoded components from the decoded further vectors; and decoding the block of samples using the copied block of reference samples.

9. A system for decoding a block of samples of an image frame from a video bitstream, the system comprising:

a memory having data and a computer program stored thereon;

a processor coupled to the memory for executing the computer program, the computer program having instructions for:

accessing a plurality of components of a vector in the video bitstream, the plurality of components indicating a spatial location in the image frame of a block of reference samples that corresponds to the block of samples;

reading a plurality of adaptation parameters from a local memory store, each adaptation parameter having independent values, the adaptation parameters being determined based on a size of a coding unit containing the block of samples, the size of the coding unit being specified in luma samples;

decoding each of the plurality of components of the vector from the video bitstream using a corresponding adaptation parameter from the plurality of adaptation parameters, wherein each said adaptation parameter is updated for use in decoding further vectors from the video bitstream using the corresponding decoded component so that each said adaptation parameter is adapted to statistics of the corresponding component that are derived from a single sequence of image frames including the image frame;

copying the block of reference samples from the video bitstream using the plurality of decoded components of the vector and decoded components from the decoded further vectors, and decoding the block of samples using the copied block of reference samples.

10. An apparatus for decoding a block of samples of an image frame from a video bitstream, the apparatus comprising:

an accessing module for accessing a plurality of components of a vector in the video bitstream, the plurality of components indicating a spatial location in the image frame of a block of reference samples that corresponds to the block samples;

a reading module for reading a plurality of adaptation parameters from a local memory store, each adaptation parameter having independent values, the adaptation parameters being determined based on a size of a coding unit containing the block of the samples, the size of the coding unit being specified in luma samples;

a decoding module for decoding each of the plurality of components of the vector from the video bitstream using a corresponding adaptation parameter from the plurality of adaptation parameters, wherein each said adaptation parameter is updated, for use in decoding further vectors from the video bitstream using the corresponding decoded component so that each said adaptation parameter is adapted to statistics of the corresponding component that are derived from a single sequence of image frames including the image frame;

a copying module for copying the block of reference samples from the video bitstream using the plurality of decoded components of the vector and decoded components from the decoded further vectors; and a decoding module for decoding the block of samples using the copied block of reference samples.

11. A non-transitory computer readable medium having a computer program stored on the medium for decoding a block of samples of an image frame from a video bitstream, the program comprising:

code for accessing a plurality of components of a vector in the video bitstream, the plurality of components indicating a spatial location in the image frame of a block of reference samples that corresponds to the block of samples;

code for reading a plurality of adaptation parameters from a local memory store, each adaptation parameter having independent values, the adaptation parameters being determined based on a size of a coding unit containing the block of samples, the size of the coding unit being specified in luma samples;

code for decoding each of the plurality of components of the vector from the video bitstream using a corresponding adaptation parameter from the plurality of adaptation parameters;

code for copying the block of reference samples from the video bitstream using the plurality of decoded components of the vector, wherein one or more of said adaptation parameters are updated using the corresponding decoded component for use in decoding further vectors from the video bitstream so that each said adaptation parameter is adapted to statistics of the corresponding component that are derived from a single sequence of image frames including the image frame; and code for decoding the block of samples using the copied block of reference samples.

12. The method according to claim 1, wherein each of the plurality of components is associated with a separate context, each context being used for updating a value of a corresponding adaptation parameter from the plurality of adaptation parameters.

13. The method according to claim 12, wherein the updated value of the adaptation parameter is stored in a corresponding context.

14. The method according to claim 1, further comprising updating a value of an adaptation parameter from the plurality of adaptation parameters using a magnitude of the corresponding decoded component of the vector.

15. The method according to claim 14, further comprising:

reading the updated value of the adaptation parameter; and decoding a component of a further vector using the updated value, wherein the decoded component corresponds to the read updated value of the adaptation parameter.

16. The method according to claim 1, wherein the plurality of components of the vector corresponds to spatial coordinates of the vector.

17. A method of encoding a block of samples of an image frame into a video bitstream, the method comprising:

determining a plurality of components of a vector, the plurality of components indicating a spatial location in the image frame of a block of reference samples that corresponds to the block of samples;

reading a plurality of adaptation parameters corresponding to the plurality of components of the vector from a local memory, the adaptation parameters being determined based on a size of a coding unit containing the block of samples, the size of the coding unit being specified in luma samples; and;

encoding each of the plurality of components of the vector into the video bitstream using a corresponding adaptation parameter from the plurality of adaptation parameters, wherein each said adaptation parameter is updated, for use in encoding further vectors into the video bitstream, using the corresponding encoded component so that each said adaptation parameter is adapted to statistics of the corresponding component that are derived from a single sequence of image frames including the image frame, and wherein each adaptation parameter is updated independently of other adaptation parameters of the plurality of adaptation parameters.

18. The method according to claim 17, wherein the adaptation parameter is a Rice parameter.

19. The method according to claim 17, wherein the adaptation parameter is a value 'k' for a kth order exponential-golomb coding process.

20. The method according to claim 17, wherein the adaptation parameters are determined based on a size of a coding unit containing the block of samples.

21. The method according to claim 17, wherein each of the plurality of components is associated with a separate context, each context being used for updating a value of a corresponding adaptation parameter from the plurality of adaptation parameters.

22. The method according to claim 21, wherein the updated value of the adaptation parameter is stored in a corresponding context.

23. The method according to claim 17, further comprising updating a value of an adaptation parameter from the plurality of adaptation parameters using a magnitude of the corresponding decoded component of the vector.

24. The method according to claim 23, further comprising:

reading the updated value of the adaptation parameter; and encoding a component of a further vector using the updated value, wherein the encoded component corresponds to the read updated value of the adaptation parameter.

25. The method according to claim 1, wherein the plurality of components of the vector corresponds to spatial coordinates of the vector.

26. A system for encoding a block of samples of an image frame into a video bitstream, the system comprising:
   a memory having data and a computer program stored thereon;
   a processor coupled to the memory for executing the computer program, the computer program having instructions for:
      determining a plurality of components of a vector, the plurality of components indicating a spatial location in the image frame of a block of reference samples that corresponds to the block of samples;
      reading a plurality of adaptation parameters corresponding to the plurality of components of the vector from a local memory, the adaptation parameters being determined based on a size of a coding unit containing the block of samples, the size of the coding unit being specified in luma samples; and
      encoding each of the plurality of components of the vector into the video bitstream using a corresponding adaptation parameter from the plurality of adaptation parameters, wherein each said adaptation parameter is updated, for use in encoding further vectors into the video bitstream, using the corresponding encoded component so that each said adaptation parameter is adapted to statistics of the corresponding component that are derived from a single sequence of image frames including the image frame, and wherein each adaptation parameter is updated independently of other adaptation parameters of the plurality of adaptation parameters.

27. An apparatus for encoding a block of samples of an image frame into a video bitstream, the apparatus comprising:
   a determining module for determining a plurality of components of a vector, the plurality of components indicating a spatial location in the image frame of a block of reference samples that corresponds to the block of samples;
   a reading module for reading a plurality of adaptation parameters corresponding to the plurality of components of the vector from a local memory store, the adaptation parameters being determined based on a size of a coding unit containing the block of samples, the size of the coding unit being specified in luma samples; and
   an encoding module for encoding each of the plurality of components of the vector into the video bitstream using a corresponding adaptation parameter from the plurality of adaptation parameters, wherein each said adaptation parameter is updated, for use in encoding further vectors into the video bitstream, using the corresponding encoded component so that each said adaptation parameter is adapted to statistics of the corresponding component that are derived from a single sequence of image frames including the image frame, and wherein each adaptation parameter is updated independently of other adaptation parameters of the plurality of adaptation parameters.

28. A non-transitory computer readable medium having a computer program stored on the medium for encoding a block of samples of an image frame into a video bitstream, the program comprising:
   code for determining a plurality of components of a vector, the plurality of components indicating a spatial location in the image frame of a block of reference samples that corresponds to the block of samples;
   code to read a plurality of adaptation parameters corresponding to the plurality of components of the vector from a local memory store, the adaptation parameters being determined based on a size of a coding unit containing the block of samples, the size of the coding unit being specified in luma samples; and
   code for encoding each of the plurality of components of the vector into the video bitstream using a corresponding adaptation parameter from the plurality of adaptation parameters, wherein each said adaptation parameter is updated, for use in encoding further vectors from the video bitstream, using the corresponding encoded component so that each said adaptation parameter is adapted to statistics of the corresponding component that are derived from a single sequence of image frames including the image frame, and wherein each adaptation parameter is updated independently of other adaptation parameters of the plurality of adaptation parameters.

29. A method of encoding a block of samples of an image frame into a video bitstream, the method comprising:
   determining a plurality of components of a vector in the video bitstream, the plurality of components indicating a spatial location in the image frame of a block of reference samples that corresponds to the block of samples;
   reading a plurality of adaptation parameters corresponding to the plurality of components of the vector from a local memory store, the adaptation parameters being determined based on a size of a coding unit containing the block of samples, the size of the coding unit being specified in luma samples; and
   encoding each of the plurality of components of the vector into the video bitstream using a corresponding adaptation parameter from the plurality of adaptation parameters, wherein one or more of said adaptation parameters are updated using the corresponding encoded component for use in encoding further vectors into the video bitstream so that each said adaptation parameter is adapted to statistics of the corresponding component that are derived from a single sequence of image frames that includes the image frame.

30. A method of encoding a block of samples of an image frame into a video bitstream, the method comprising:
   determining a plurality of components of a vector, the plurality of components indicating a spatial location in the image frame of a block of reference samples that corresponds to the block of samples;
   reading a plurality of adaptation parameters from a local memory store, each adaptation parameter having independent values, the adaptation parameters being determined based on a size of a coding unit containing the block of samples, the size of the coding unit being specified in luma samples; and
   encoding each of the plurality of components of the vector into the video bitstream using a corresponding adaptation parameter from the plurality of adaptation parameters, wherein each said adaptation parameter is updated, for use in encoding further vectors into the video bitstream, using the corresponding encoded component so that each said adaptation parameter is adapted to statistics of the corresponding component that are derived from a single sequence of image frames that includes the image frame.

31. A system for encoding a block of samples of an image frame into a video bitstream, the system comprising:
a memory having data and a computer program stored thereon;
a processor coupled to the memory for executing the computer program, the computer program having instructions for:
determining a plurality of components of a vector, the plurality of components indicating a spatial location in the image frame of a block of reference samples that corresponds to the block of samples;
reading a plurality of adaptation parameters from a local memory store, each adaptation parameter having independent values, the adaptation parameters being determined based on a size of a coding unit containing the block of samples, the size of the coding unit being specified in luma samples; and
encoding each of the plurality of components of the vector into the video bitstream using a corresponding adaptation parameter from the plurality of adaptation parameters; wherein
each said adaptation parameter is updated, for use in encoding further vectors into the video bitstream, using the corresponding encoded component so that each said adaptation parameter is adapted to statistics of the corresponding component that are derived from a single sequence of image frames that includes the image frame.

32. An apparatus for encoding a block of samples of an image frame into a video bitstream, the apparatus comprising:
a determining module for determining a plurality of components of a vector, the plurality of components indicating a spatial location in the image frame of a block of reference samples that corresponds to the block of samples;
a reading module for reading a plurality of adaptation parameters from a local memory store, each adaptation parameter having independent values, the adaptation parameters being determined based on a size of a coding unit containing the block of samples, the size of the coding unit being specified in luma samples; and
an encoding module for encoding each of the plurality of components of the vector into the video bitstream using a corresponding adaptation parameter from the plurality of adaptation parameters; wherein
each said adaptation parameter is updated, for use in encoding further vectors into the video bitstream, using the corresponding encoded component so that each said adaptation parameter is adapted to statistics of the corresponding component that are derived from a single sequence of image frames that includes the image frame.

33. A non-transitory computer readable medium having a computer program stored on the medium for encoding a block of samples of an image frame into a video bitstream, the program comprising:
code for determining a plurality of components of a vector, the plurality of components indicating a spatial location in the image frame of a block of reference samples that corresponds to the block of samples;
code for reading a plurality of adaptation parameters from a local memory store, each adaptation parameter having independent values, the adaptation parameters being determined based on a size of a coding unit containing the block of samples, the size of the coding unit being specified in luma samples; and
code for encoding each of the plurality of components of the vector into the video bitstream using a corresponding adaptation parameter from the plurality of adaptation parameters; wherein
one or more of said adaptation parameters are updated using the corresponding encoded component for use in encoding further vectors into the video bitstream so that each said adaptation parameter is adapted to statistics of the corresponding component that are derived from a single sequence of image frames that includes the image frame.

* * * * *